US007406181B2

(12) United States Patent
O'Boyle et al.

(10) Patent No.: US 7,406,181 B2
(45) Date of Patent: Jul. 29, 2008

(54) OCCUPANT DETECTION SYSTEM

(75) Inventors: Michael E. O'Boyle, Brighton, MI (US);
Owen A. Davies, Goleta, CA (US);
Gregory G. Schamp, South Lyon, MI
(US); James C. Demro, Santa Barbara,
CA (US)

(73) Assignee: Automotive Systems Laboratory, Inc.,
Farmington Hills, MI (US)

( * ) Notice: Subject to any disclaimer, the term of this patent is extended or adjusted under 35 U.S.C. 154(b) by 394 days.

(21) Appl. No.: 10/957,968

(22) Filed: Oct. 4, 2004

(65) Prior Publication Data
US 2005/0111700 A1 May 26, 2005

Related U.S. Application Data

(60) Provisional application No. 60/508,582, filed on Oct. 3, 2003.

(51) Int. Cl.
*G06K 9/00* (2006.01)
(52) U.S. Cl. .................. 382/104; 382/205; 382/218
(58) Field of Classification Search ................ 382/104, 382/205, 218; 280/735; 348/47; 701/1
See application file for complete search history.

(56) References Cited

U.S. PATENT DOCUMENTS

| | | | | |
|---|---|---|---|---|
| 4,625,329 A | 11/1986 | Ishikawa et al. | ................ | 382/1 |
| 4,628,362 A | 12/1986 | Waehner | | |
| 4,864,121 A | 9/1989 | Pietzsch | ................. | 250/221 |
| 4,918,583 A | 4/1990 | Kudo et al. | ................. | 362/268 |
| 4,933,541 A | 6/1990 | Dufour | ..................... | 250/202 |
| 4,954,962 A | 9/1990 | Evans, Jr. et al. | ............ | 364/513 |
| 5,016,173 A | 5/1991 | Kenet et al. | ............ | 364/413.13 |
| 5,039,035 A | 8/1991 | Fitzpatrick | ................. | 244/122 |
| 5,040,116 A | 8/1991 | Evans, Jr. et al. | ............ | 364/424.02 |

(Continued)

FOREIGN PATENT DOCUMENTS

CA 2244061 9/1998

OTHER PUBLICATIONS

U.S. Appl. No. 09/882,959, *Occupant Sensor*, Naveed Mahbub, filed Jun. 15, 2001.

(Continued)

*Primary Examiner*—Bravesh M Mehta
*Assistant Examiner*—John B Strege
(74) *Attorney, Agent, or Firm*—Raggio & Dinnin, P.C.

(57) ABSTRACT

A camera (32) captures successive images of light stripes (22) projected onto an object by a light curtain (18) positioned by a light source positioner (28). A background image is subtracted (616) therefrom, and the resulting image is boosted by binning (618), binarized with a thresholding algorithm (620), skeletonized (622), interpolated (624) and stored (626). Interpolated images are acquired for a plurality of light stripes (22). A processor (30) generates (1604) a 3-D surface model from Cartesian coordinates computed for non-zero camera pixels. A volumetric representation is determined (1610) from the offset of the object surface model relative to a model of a proximate surface, e.g. a seating surface (24). The object is classified (1614), e.g. by a trainable pattern recognitions system, responsive to 3-D shape descriptors (1606) of the 3-D surface model and to the volumetric representation (1610) or portions (1612) thereof. The detection of an occupant (14) in a vehicle (12) may be used to control a safety restraint system (36).

55 Claims, 14 Drawing Sheets

U.S. PATENT DOCUMENTS

| | | | |
|---|---|---|---|
| 5,381,236 A | 1/1995 | Morgan | 356/376 |
| 5,455,685 A | 10/1995 | Mori | |
| 5,482,314 A | 1/1996 | Corrado et al. | |
| 5,528,698 A | 6/1996 | Kamei et al. | 382/100 |
| 5,531,472 A | 7/1996 | Semchena et al. | 280/735 |
| 5,684,898 A | 11/1997 | Brady et al. | 382/282 |
| 5,785,347 A | 7/1998 | Adolph et al. | 280/735 |
| 5,852,672 A | 12/1998 | Lu | 382/154 |
| 5,890,085 A | 3/1999 | Corrado et al. | |
| 5,961,571 A | 10/1999 | Gorr et al. | |
| 5,983,147 A | 11/1999 | Krumm | 701/45 |
| 5,988,862 A | 11/1999 | Kacyra et al. | 364/578 |
| 5,995,650 A | 11/1999 | Migdal et al. | |
| 6,005,958 A | 12/1999 | Farmer et al. | 382/103 |
| 6,026,340 A | 2/2000 | Corrado et al. | |
| 6,027,138 A | 2/2000 | Tanaka et al. | 280/735 |
| 6,113,137 A | 9/2000 | Mizutani et al. | 280/735 |
| 6,167,155 A | 12/2000 | Kostrzewski et al. | 382/232 |
| 6,198,998 B1 | 3/2001 | Farmer et al. | 382/103 |
| 6,272,411 B1 | 8/2001 | Corrado et al. | |
| 6,512,838 B1 | 1/2003 | Rafii et al. | 382/106 |
| 6,587,186 B2 | 7/2003 | Bamji et al. | 356/5.01 |
| 6,614,422 B1 | 9/2003 | Rafii et al. | 345/168 |
| 6,674,895 B2 | 1/2004 | Rafii et al. | 382/154 |
| 6,710,770 B2 | 3/2004 | Tomasi et al. | 345/168 |
| 6,801,662 B1 | 10/2004 | Owechko et al. | |
| 6,947,575 B2 * | 9/2005 | Wallace et al. | 382/104 |
| 6,961,443 B2 | 11/2005 | Mahbub | |
| 6,968,073 B1 * | 11/2005 | O'Boyle et al. | 382/104 |
| 2001/0019361 A1 | 9/2001 | Savoye | 348/222 |
| 2001/0035636 A1 | 11/2001 | Adachi | 280/735 |
| 2002/0018649 A1 | 2/2002 | Hakamata | 396/17 |
| 2002/0021287 A1 | 2/2002 | Tomasi et al. | 345/168 |
| 2002/0024808 A1 | 2/2002 | Suehiro et al. | 362/245 |
| 2002/0050924 A1 | 5/2002 | Mahbub | |
| 2002/0051578 A1 | 5/2002 | Imagawa et al. | |
| 2002/0113106 A1 | 8/2002 | Breed et al. | |
| 2002/0140633 A1 | 10/2002 | Rafii et al. | 345/8 |
| 2003/0125855 A1 | 7/2003 | Breed et al. | |
| 2003/0132921 A1 | 7/2003 | Torunoglu et al. | 345/173 |
| 2003/0156756 A1 | 8/2003 | Gokturk et al. | 382/190 |
| 2003/0165048 A1 | 9/2003 | Bamji et al. | 361/681 |
| 2003/0169906 A1 | 9/2003 | Gokturk et al. | 382/115 |
| 2003/0174125 A1 | 9/2003 | Torunoglu et al. | 345/168 |
| 2003/0204384 A1 | 10/2003 | Owechko et al. | |
| 2003/0209893 A1 | 11/2003 | Breed et al. | |
| 2003/0235341 A1 | 12/2003 | Gokturk et al. | 382/243 |
| 2004/0046744 A1 | 3/2004 | Rafii et al. | 345/168 |
| 2004/0066500 A1 | 4/2004 | Gokturk et al. | 356/40.1 |
| 2004/0136564 A1 | 7/2004 | Roeber et al. | 382/100 |
| 2004/0153229 A1 | 8/2004 | Gokturk et al. | 701/45 |
| 2005/0024324 A1 | 2/2005 | Tomasi et al. | 345/156 |
| 2005/0162638 A1 | 7/2005 | Suzuki et al. | |
| 2006/0208169 A1 * | 9/2006 | Breed et al. | 250/221 |

OTHER PUBLICATIONS

"Thinning", HyperMedia Image Processing Reference, The University of Edinburgh, downloaded from "http://www.cee.hw.ac.uk.hipr/html/hipr_top.html" on Sep. 5, 2003, 8 pp.

Boverie et al., "Intelligent System for Video Monitoring of Vehicle Cockpit," SAE 980613, Feb. 23-26, 1998.

Conde et al., "A Smart Airbag Solution Based on a High Speed CMOS Camera System", 1999 IEEE Internaltional Conference on Image Processing, pp. 930-934.

Ramesh et al., "Real-Time Video Surveillance and Monitoring for Automotive," SAE 2001-01-0347, Mar. 6-9, 2000.

Lequellec et al., "Car Cockpit 3D Reconstruction by a Structured Light Sensor" IEEE Intelligent Vehicles Symposium 2000, Oct. 3-5, 2000, pp. 87-92.

Siemens, "Sensors: All-Round Talent", NewWorld, Feb. 2001, downloaded from the internet on Aug. 20, 2007 from http://w4.siemens.de/Ful/en/archiv/newworld/heft2_01/artikel03/index.html.

The Univeristy of Edinburgh, "Thinning", HyperMedia Image Processing Reference, downloaded from "http://www.cee.hw.ac.uk/hipr/html/thin.html" on May 31, 2007, 6 pp.

The Univeristy of Edinburgh, "Skeletonization", HyperMedia Image Processing Reference, downloaded from "http://www.cee.hw.ac.uk/hipr/html/skeleton.html" on May 31, 2007, 4 pp.

International Search Report in International Application No. PCT/US04/032711, Aug. 24, 2006.

Supplementary European Search Report in European Application No. EP 04 80 9863 based upon International Application No. PCT/US04/032711, Mar. 13, 2007.

* cited by examiner

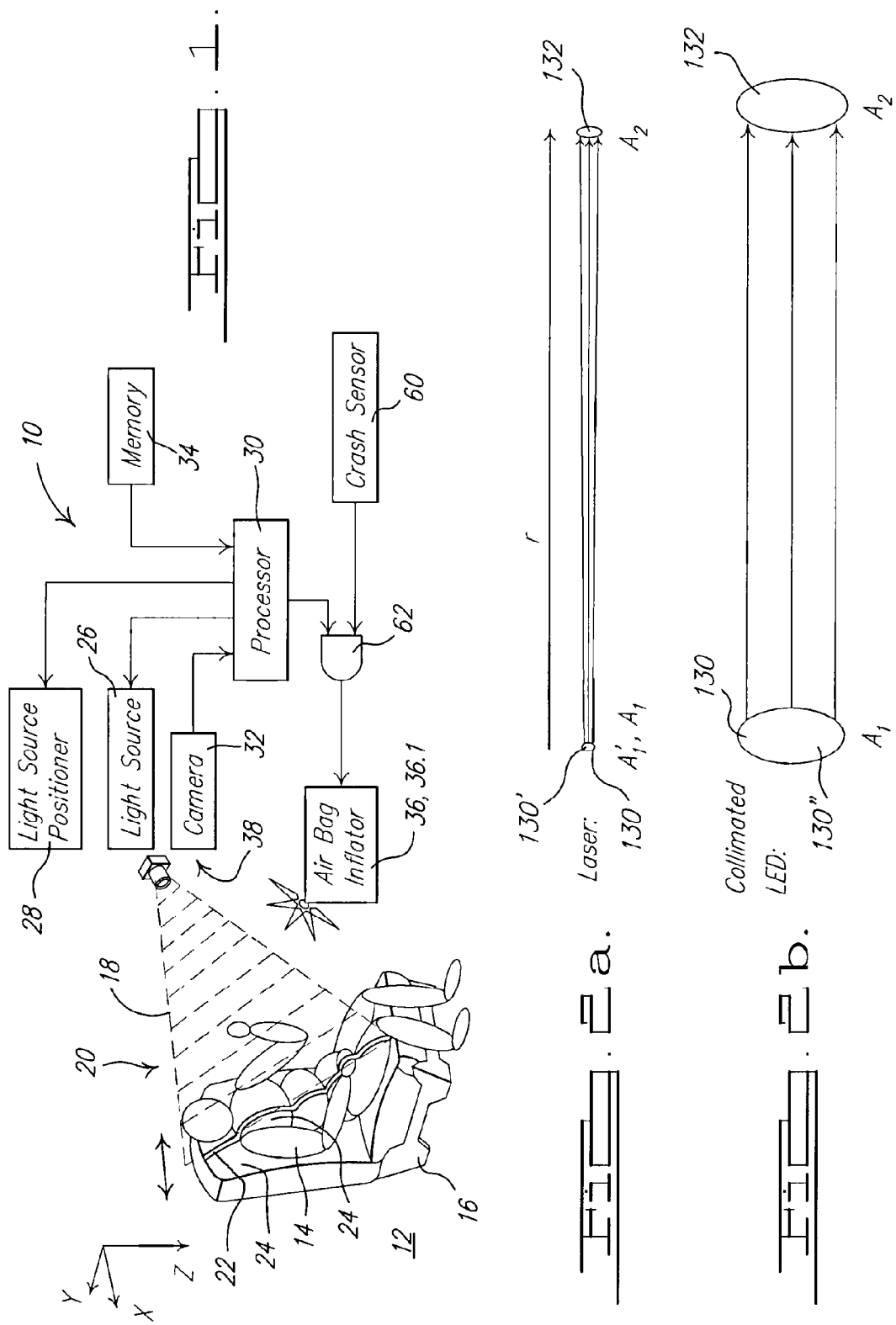

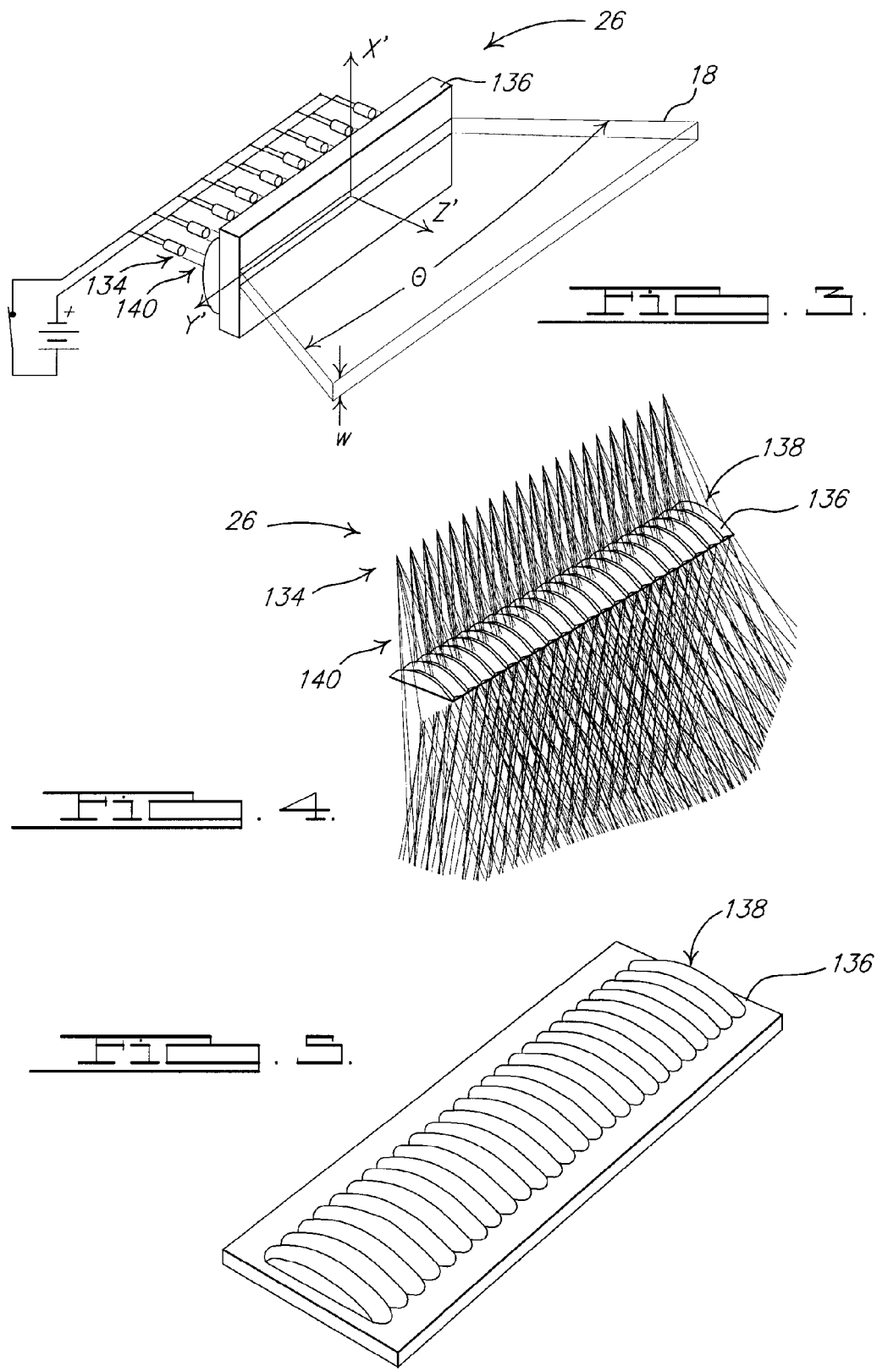

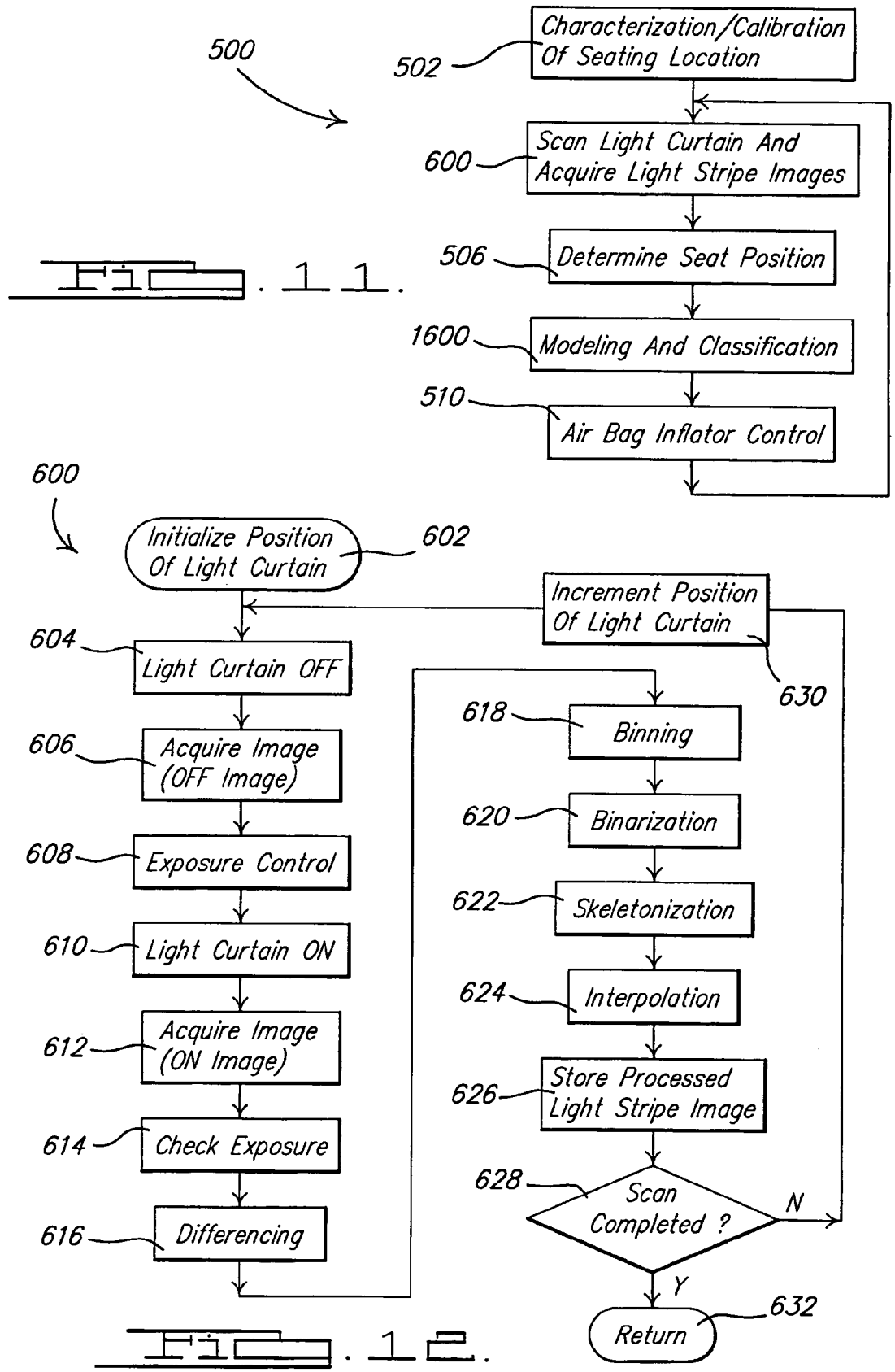

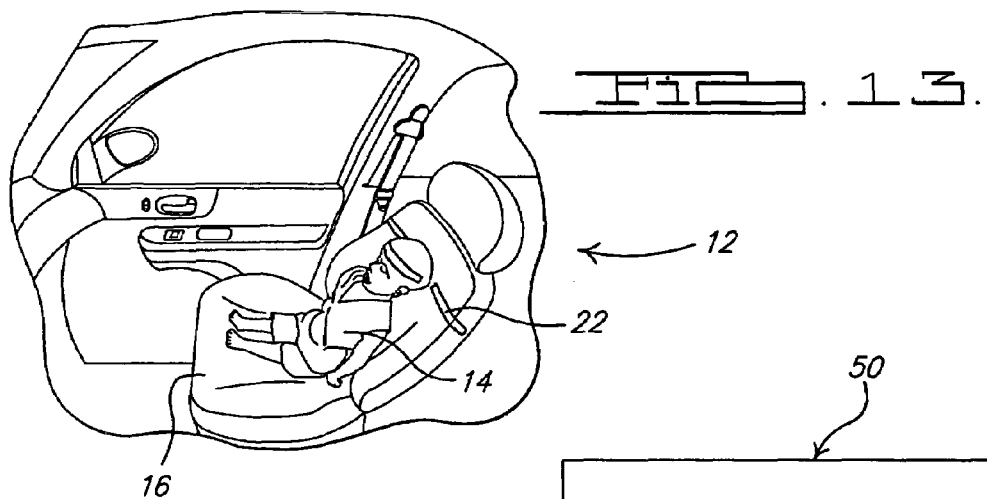
FIG. 13.
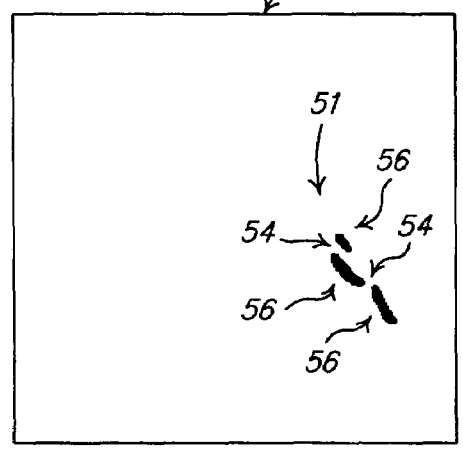
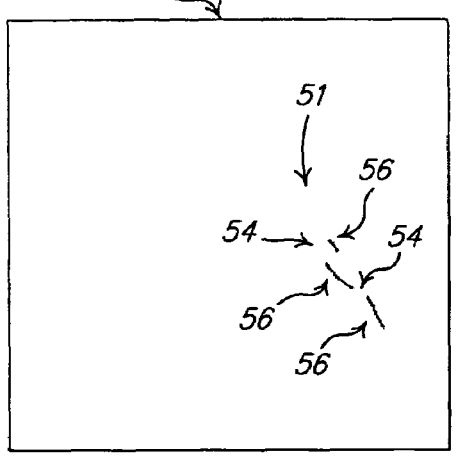
FIG. 14.
FIG. 15.
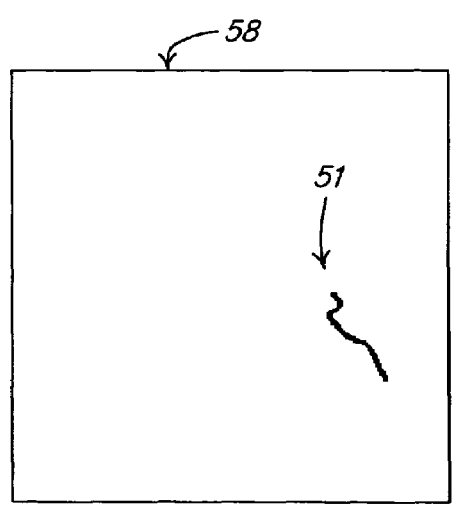
FIG. 16.

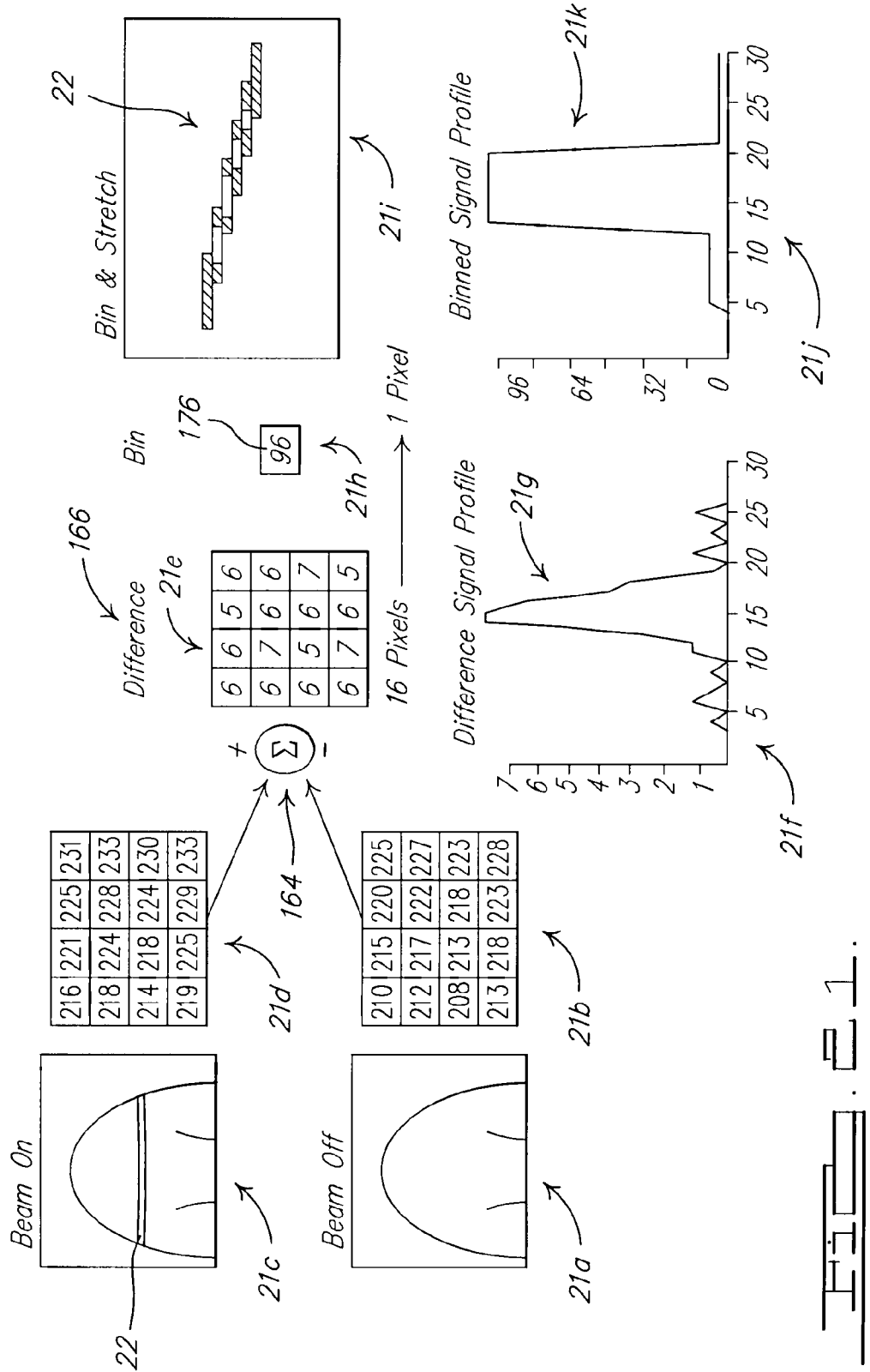

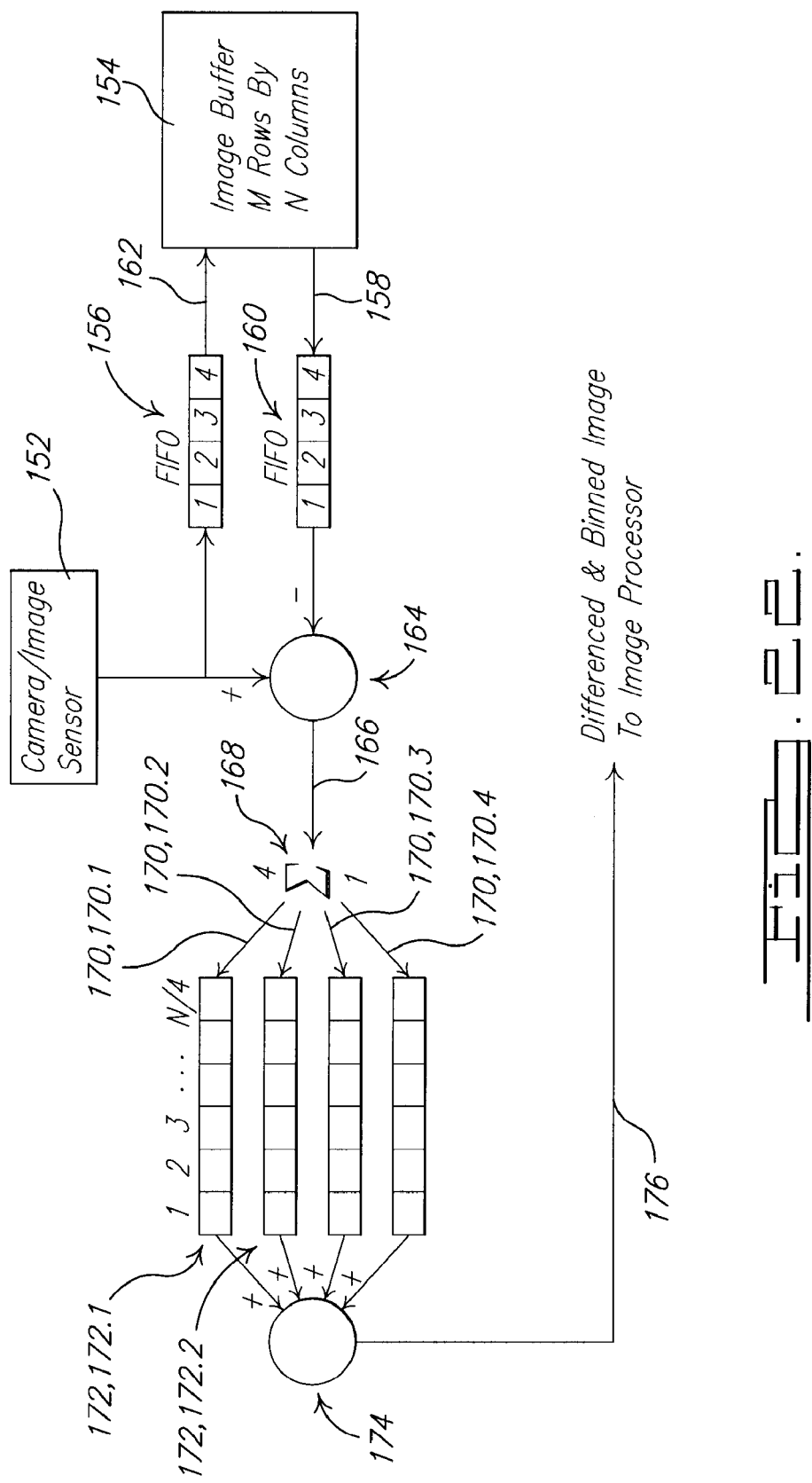

OCCUPANT DETECTION SYSTEM

CROSS-REFERENCE TO RELATED APPLICATIONS

The instant application claims the benefit of U.S. Provisional Application Ser. No. 60/508,582 filed on Oct. 3, 2003, which is incorporated herein by reference.

U.S. application Ser. No. 09/882,959, filed on Jun. 15, 2001, now U.S. Pat. No. 6,961,443, entitled Occupant Sensor, and U.S. application Ser. No. 10/132,349, filed on Apr. 24, 2002, now U.S. Pat. No. 6,968,073, entitled Occupant Detection System, are also incorporated herein by reference.

BRIEF DESCRIPTION OF THE DRAWINGS

In the accompanying drawings:

FIG. 1 illustrates a normally seated occupant in a vehicle incorporating an occupant detection system;

FIG. 2a illustrates the radiance of a laser beam;

FIG. 2b illustrates the radiance of a LED;

FIG. 3 illustrates a light source for generating a light curtain;

FIG. 4 illustrates a simulation of a light source;

FIG. 5 illustrates a perspective view of cylindrical fan-out lens incorporated in a light source;

FIG. 11 illustrates a flow chart of an occupant detection process;

FIG. 12 illustrates a flow chart of a process for acquiring a set of images of scanned light stripes;

FIG. 13 illustrates an image of an occupant in a passenger seat illuminated by a light curtain that projects a substantially azimuthal light stripe across the occupant and seating area;

FIG. 14 illustrates an image of the light stripe from FIG. 13 after subtractive image processing to remove background information, binning to boost the signal level, and binarization;

FIG. 15 illustrates an image of the light stripe from FIG. 14 after image processing with a skeletonization operation;

FIG. 16 illustrates an image of the light stripe from FIG. 15 after image processing using an interpolation process to fill gaps in the light stripe;

FIG. 21 illustrates an example of an image differencing process and an image binning process, of the image preprocessing process;

FIG. 22 illustrates an example of a methodology of the image differencing process and the image binning process;

FIG. 25b illustrates a composite of interpolated light stripes corresponding to the image of FIG. 25a;

FIG. 26b illustrates a composite of interpolated light stripes corresponding to the image of FIG. 26a;

DESCRIPTION OF EMBODIMENT(S)

Figure 6:
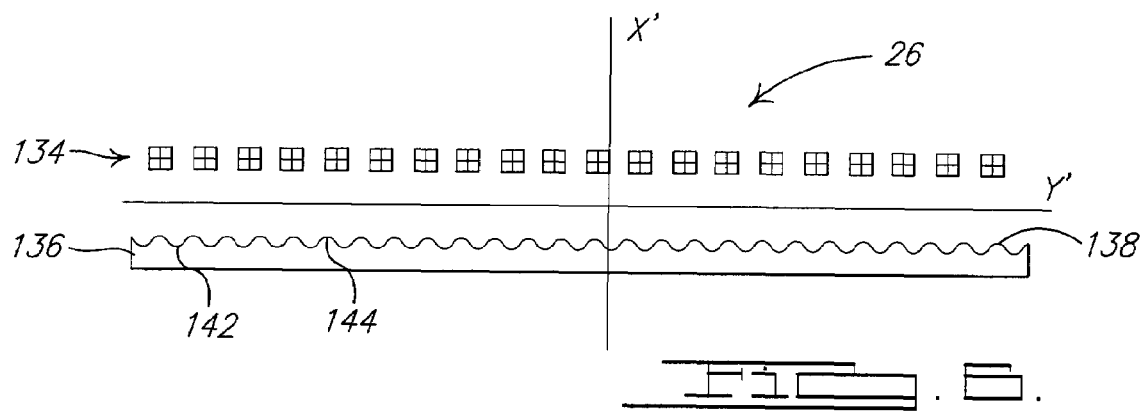
FIG. 6 illustrates a side-profile of a light source including a cross-sectional view of an associated cylindrical fan-out lens.

A vehicle may contain safety restraint actuators that are activated responsive to a vehicle crash for purposes of mitigating occupant injury. Examples of such automatic safety restraint actuators include air bags, seat belt pretensioners, and side curtains. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. Automatic restraint systems can benefit from dynamic suppression, which provides for disabling an airbag or other safety device in pre-crash braking situations or concatenated crash events; and there exists a need for an improved occupant detection system that can detect and classify a variety of objects, and which is sufficiently fast under pre-crash braking or crash conditions to detect whether or not an occupant is located so as to be likely at risk of injury from the deployment of the automatic restraint system, shortly before a prospective deployment thereof.

Referring to FIG. 1, an occupant detection system 10 incorporated in a vehicle 12 detects an occupant 14 or object on a seat 16 therein by scanning a light curtain 18 across the region 20 in front of the seat 16, imaging the resulting light stripe 22 formed at the intersection of the light curtain 18 with objects illuminated thereby, calculating a profile of a surface 24 upon which the light stripe 22 is located, and classifying the corresponding seat occupancy condition responsive thereto. The light curtain 18 is generated by a light source 26, which is positioned by a light source positioner 28 responsive to a signal from a processor 30. A camera 32 captures successive images of the reflection of the light stripe 22 from objects illuminated by the light curtain 18, responsive to successively activating and then repositioning the light source 26. The successive images are captured in a memory 34 of the processor 30 and processed so as to classify the image for purposes of controlling a safety restraint system 36—e.g. an air bag inflator 36.1—responsive thereto.

FIG. 1 illustrates a Cartesian coordinate system associated with an exemplary embodiment, wherein the Y-axis is oriented parallel to the longitudinal axis of the vehicle 12, positive rearward; the X-axis is oriented parallel to lateral axis of the vehicle 12, positive rightward, i.e., towards the passenger-side door; and the Z-axis is oriented parallel to the vertical (elevation) axis of the vehicle 12, positive downward. The origin of the coordinate system is at the camera lens 38, although in FIG. 1, the point of intersection of the coordinate axes is shown displaced from the camera 32 to avoid cluttering the illustration of FIG. 1.

The light source 26 generates a light curtain 18 along a surface, e.g. a planar surface, using one or more light generators, for example, a laser, or one or more light emitting diodes (LED's) that interact with a transforming element adapted to form the light curtain 18 from the light emitted by the one or more light generators of the light source 26. In one embodiment, as described more fully hereinbelow, the light generators of the light source 26 comprise a plurality of light emitting diodes (LED's) that generate near-infrared light that is invisible to the naked eye, and that is adapted to be eye-safe without necessitating other forms of eye protection, thereby avoiding the regulatory and safety problems that may otherwise be associated with laser-based illumination. This light source 26 is also adapted in conjunction with an associated image processing algorithm—as described more fully hereinbelow—so as to provide sufficient illumination to be detectable under conditions of direct sunlight illumination of the occupant 14—a potential condition under which the occupant detection system 10 would need to operate. The use of structured lighting within the interior of a vehicle presents formidable challenges because it is difficult to recover the projected line in conditions of direct sunlight. In order to reduce ambient sunlight levels in the camera 32, a long-pass filter (i.e. that passes relatively longer wavelengths) with a cut-on wavelength of approximately 800 nanometers is placed over the camera lens 38. However, even with this filter, a light source with a relatively high level of illumination power would otherwise be required—absent further image processing—in order for the camera 32 to be able to see the light curtain 18 under conditions of direct ambient sunlight illumination. The intensity of a laser beam of sufficient brightness to be visible to the camera 32 under conditions of direct ambient sunlight illumination would likely exceed the eye-safe limits for long term viewing by an occupant 14, and would thus present both regulatory and safety problems. An invisible light source 26—e.g. using a near-infrared frequency—is inconspicuous to an occupant 14, however regulations associated with near-infrared radiation are generally more stringent than for visible radiation because the eye does not exhibit a natural avoidance reaction (e.g. pupil contraction) when directly viewing an invisible light source as it does for a visible light source.

Referring to FIGS. 2a and 2b, radiance is a mapping of flux through space from a source 130 to a receiver 132. For both the source 130 and the receiver 132 oriented normal to the direction of propagation of radiation, the source radiance L is given as the flux φ flowing between the source 130 and the receiver 132 divided by the product of the source area $A_1$ and the receiver area $A_2$, and further divided by the square of the distance r between the source 130 and the receiver 132. This can also be expressed as the irradiance $E_{receiver}$ at the receiver divided by source area $A_1$ times the square of the distance r (i.e. source solid angle). It should be noted that source radiance L is independent of the distance r between source 130 and the receiver 132. The source radiance L is given as follows:

$$L = \frac{Flux/\text{unit\_receive\_area}}{\text{unit\_source\_solid\_angle}} = \frac{\phi}{\frac{A_1}{r^2}A_2} = \frac{E_{receiver}}{\frac{A_1}{r^2}} \text{ W/cm}^2 \text{ steridian}$$

Accordingly, it can be seen that a laser source 130' having a relatively small source area $A_1'$, a correspondingly relatively small divergence, and a resulting relatively small receiver area $A_2$, has a correspondingly relatively high values of source radiance L, which can be unsafe to a view with a human eye receiver 132. By comparison, a LED source 130" having a relatively large source area $A_1$ and a correspondingly relatively large receiver area $A_2$ provides for a substantially lower source radiance L than laser source 130'. By increasing both the source area $A_1$ and the receiver area $A_2$, the source radiance L is substantially reduced, thereby enabling the design of a light source 26 that is eye-safe, but with sufficient associated flux φ that the signal can be recovered by subsequent image processing, even under conditions of direct ambient sunlight illumination.

The light source 26 uses an eye-safe source of illumination, e.g. light emitting diode (LED) based illumination sources in the 800-900 nanometer range, so as to provide an additional margin of safety in the event that the cover of the light source 26 were opened or otherwise broken. The United States Food and Drug Administration Center for Devices and Radiological Health sets the eye-safe limit for radiation in the 800-900 nanometer range based upon the source radiance. The light source 26 is designed so as to be eye-safe under the longest term viewing conditions, which are specified at 10,000 seconds (approximately 2.8 hours) of continuous staring into the source by a human being. For example, the Center for Devices and Radiological Health specifies that for radiation of 880 nanometers and continuous staring into the source for 10,000 seconds that the source radiance not exceed 447 milliwatts per square centimeter per steridian.

The light source 26 comprises a means for forming the light curtain 18 from the light generated by the one or more associated light generators. For example, in one embodiment, the light source 26 comprises a plurality of LED's that cooperate with a cylindrical fan-out lens (e.g. a plano-cylindrical fan-out lens) to generated a continuous, substantially planar light curtain 18 which is sufficiently thick so as to provide for eye-safety. More particularly, referring to FIGS. 3-7, the light source 26 comprises a plurality of light emitting diodes (LED's) 134 and a cylindrical fan-out lens 136 (e.g. piano-cylindrical fan-out), the combination of which is adapted to generate a light curtain 18. Designating the longitudinal axis of the cylindrical fan-out lens 136 as Y', and the transverse axis across the planar surface of the lens as X', the LED's 134 are positioned at about one focal length in the −Z' direction from the cylindrical fan-out lens 136 so that the resulting light curtain 18 propagates in the +Z' direction, is substantially collimated in the X' direction (X'Z' plane), and fans out in the +/−Y' directions (Y'Z' plane), as illustrated in FIG. 3, wherein X', Y', and Z' are mutually orthogonal. The convex side of the cylindrical fan-out lens 136 is provided with a series of corrugations 138 that act to distribute and fan-out the light in the +/−Y' directions, so as to transform the discrete beams of light 140 generated by the LED's 134 into a light curtain 18, as further illustrated in FIG. 4 by a simulation of the operation of the light source 26. The combination of the shape(s) of the corrugations 138 and the size and Y' spacing of the LED's 134 influences the uniformity of the light curtain 18 along the Y' direction, and is adapted to provide for a relatively uniform light distribution to the extent possible.

A cylindrical lens without the corrugations 138 would produce a linear beam of light (i.e. light curtain 18), but lacks sufficient control to provide both a line of light of a particular length while also maintaining beam uniformity and intensity. Instead, the degree of fan-out (or lack thereof), and the variation of intensity along the length of the beam is governed by the light distribution characteristics of the associated LED's 134. Several LED 134 sources are generally required in order to provide a light beam of sufficient intensity.

Figure 7:
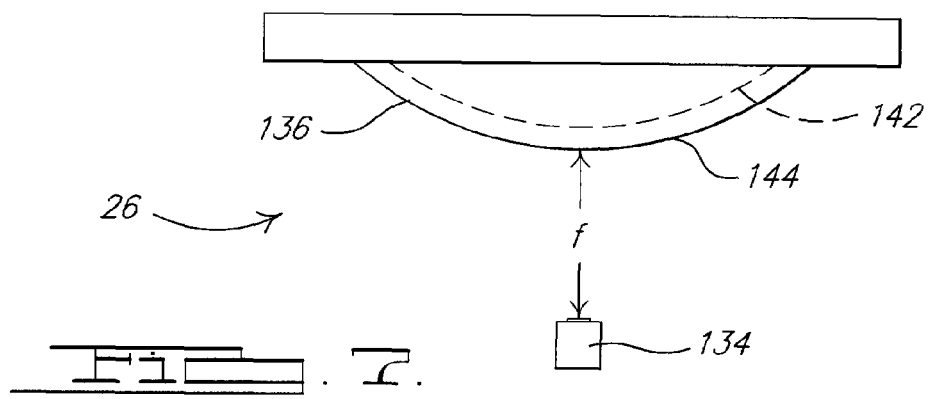
FIG. 7 illustrates an end-profile of the light source illustrated in FIG. 6.

The cylindrical lens shape and corresponding focal length of the cylindrical fan-out lens 136 was chosen based on the characteristics of the associated LED 134 (e.g. beam divergence and size) and the restrictions on overall size for the particular application and so as to provide for substantial collimation in the X' direction—i.e. along the thickness of the light curtain 18. The corrugations 138 on the cylindrical surface of the cylindrical fan-out lens 136 provide improved uniformity of the light curtain 18 and provide for spreading the light in the elevation, i.e. Y', direction with a sufficient fan-out so that the occupant 14 or object on the seat 16 can be illuminated by light from the cylindrical fan-out lens 136 that is substantially shorter—and therefore easier to package—than a cylindrical lens without benefit of the corrugations 138. The overall length of the cylindrical fan-out lens 136 was determined both by the number of LED's 134 required to provide the intensity and by the spacing of the LED's 134 in relation to the corrugations 138. In the exemplary lens illustrated in FIG. 5, the underlying cylindrical focal length was 30 millimeters. The corrugations 138 were formed by a cylindrical surface of revolution, wherein FIG. 6 illustrates the generating curve of this surface, and FIG. 7 illustrates an end-view of the cylindrical fan-out lens 136 showing the revolution of this cross-section. The corrugations 138 of the generating curve of the exemplary cylindrical fan-out lens 136 have a 1 millimeter peak-to-peak radial amplitude and a 3 millimeter peak-to-peak Y' separation, wherein the upper and lower third of the curves comprise a standard conic sections (e.g. parabolic) that are blended with a G2 continuous degree 5 span Bezier curve, as provided by a optical computer aided design (CAD) program call Rhinoceros, sold by Robert McNeel and Associates.

The plurality of LED's 134 were located along a line parallel to the longitudinal (Y') axis of the cylindrical fan-out lens 136, on the cylindrical side thereof, about one focal length away therefrom. The longitudinal (Y') spacing of the LED's 134 was different from the peak-to-peak spacing of the corrugations 138 so as to improve the uniformity of illumination along the length of the light curtain 18. The uniformity of the illumination decreased as the spacing of the LED's 134 approaches that of the corrugations 138. In the exemplary light source 26, the spacing between adjacent LED's 134 was about 4 millimeters, and the set of LED's 134 was aligned with the corrugations 138 so that every third LED 134 was aligned with a valley 142 of the corrugations 138, and none of the LED's 134 were aligned with any of the peaks 144 thereof. A concave portion of the corrugations 138 proximate to valley 142 acts as a concave refractive surface which tends to cause light illuminated therefrom by a LED 134 to diverge, whereas a convex portion of the corrugations 138 proximate to a peak 144 acts as a convex refractive surface which tends to cause light illuminated therefrom by a LED 134 to converge. Accordingly, the alignment of a LED 134 with a peak 144 tends to concentrate the light from that LED 134 along the Y' direction, thereby reducing uniformity of the light projected by the light curtain 18, so that to improve uniformity of the light projected by the light curtain 18, it is beneficial to offset the LED's 134 from the proximate peaks 144 of the corrugations 138.

Light from individual LED's 134 of the light source 26 is spread out along the length of the line of light projected by the light curtain 18, and the intensity of the light curtain 18 can be adjusted by either adjusting the intensity of the individual LED's 134 or by changing the number of LED's 134 that are incorporated in the light source 26—without redesigning the cylindrical fan-out lens 136 or, more particularly, the corrugations 138 thereof. The corrugations 138 of the cylindrical fan-out lens 136 provide for controlling the variation in intensity of the light projected by the light curtain 18, and for controlling the fan-out angle θ which determines the length of the light source 26—as determined by the length of the cylindrical fan-out lens 136—necessary to produce a light curtain 18 of sufficient extent to illuminate a particular region. The width w (or thickness) of the light curtain 18 is determined by the lateral extent of the LED's 134 and the cylindrical focal properties of the cylindrical fan-out lens 136, which includes the location of the LED's 134 relative to the cylindrical fan-out lens 136 and the distance from the cylindrical fan-out lens 136 along the light curtain 18 if the light curtain 18 is not perfectly collimated. Whereas the light source 26 has been illustrated with a cylindrical fan-out lens 136 having an underlying plano-cylindrical shape, and with the LED's 134 located on the cylindrical side of the cylindrical fan-out lens 136, it should be understood that 1) the cylindrical fan-out lens 136 could be curved on both sides, and 2) that the LED's 134 could alternatively be located on the planar side of a plano-cylindrical fan-out lens 136.

In another embodiment, the light source 26 could comprise a laser in cooperation with a lens, a lens assembly, a holographic element, or a combination adapted to generate the light curtain 18. In yet another embodiment, the light curtain 18 could be segmented, e.g. comprising a plurality of distinct spot beams. In yet another embodiment, the light curtain 18 could be formed from a single, scanned spot beam.

Figure 8:
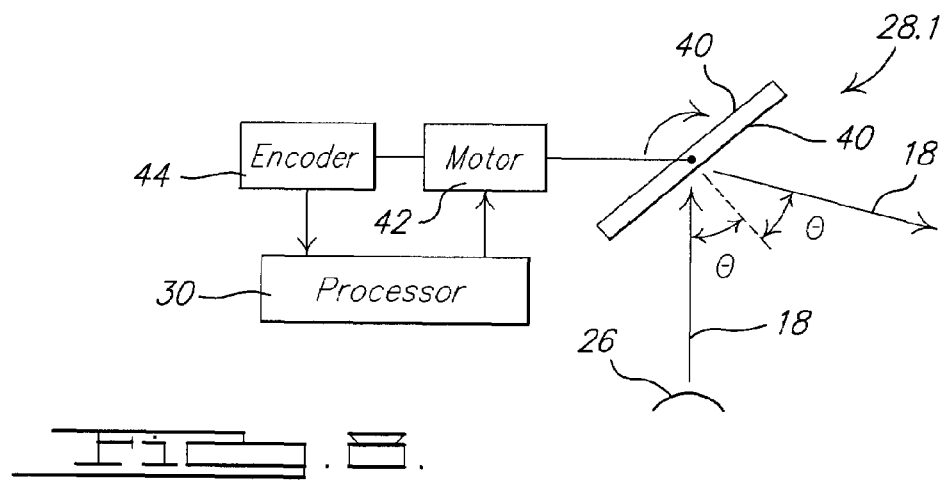
FIG. 8 illustrates a motor driven rotating mirror for scanning a light curtain.

Referring to FIG. 8, in one embodiment of a light source positioner 28.1, the light curtain 18 generated by the light source 26 is scanned across the region 20 in front of the seat 16, for example, by reflecting the light curtain 18 with a rotating mirror 40. The angle scanned by the light curtain 18 is twice the rotation angle θ of the mirror 40. In one embodiment, the mirror 40 is double-sided mirror so as to provide for two complete scans of the region 20 for each complete rotation of the mirror 40. In another embodiment, a multi-faceted mirror could be incorporated so as to increase the percentage of time in which the light curtain 18 is positioned within the region 20, i.e. to increase the associated scanning duty cycle.

For example, the mirror 40 may be driven by a motor 42, e.g. a DC brushless motor for improved reliability, wherein the mirror 40 is continuously rotated by the motor 42, and the position of the mirror 40 can be monitored by an encoder 44, e.g. a rotary encoder, e.g. a shaft encoder, e.g. either optical or magnetic, operatively coupled to either the mirror 40 or the motor 42. In another embodiment, the mirror position is determined by integrating rotational velocity, which can either be measured or inferred. In another embodiment, the mirror 40 is driven by a stepper motor, and the position of the mirror 40 is monitored by counting control steps applied to the stepper motor.

The encoder 44, if used, may be adapted to provide a measure of absolute position. Otherwise, the above-described measures of mirror position are combined with a reference signal that provides an indication of a particular reference position of the mirror 40, from which the absolute position of the mirror 40 can be determined. For example, the reference signal could be generated using ether a magnetic or optical sensor that is adapted to cooperate with an element of or on a shaft, e.g. a reflective mark or a ferromagnetic protrusion, so as to generate a once/revolution signal.

In another embodiment, the reference signal for determining the absolute position of the mirror 40 can be obtained by sampling the interior of the vehicle 12 with the camera 32. A reference position high on the vehicle B pillar or on the headliner of the vehicle 12, which is unlikely to be occluded, could be used as a reference point, wherein the reference signal would be generated when the light curtain 18 intersects this reference point. This approach may also preclude the need for an encoder 44.

Figure 9:
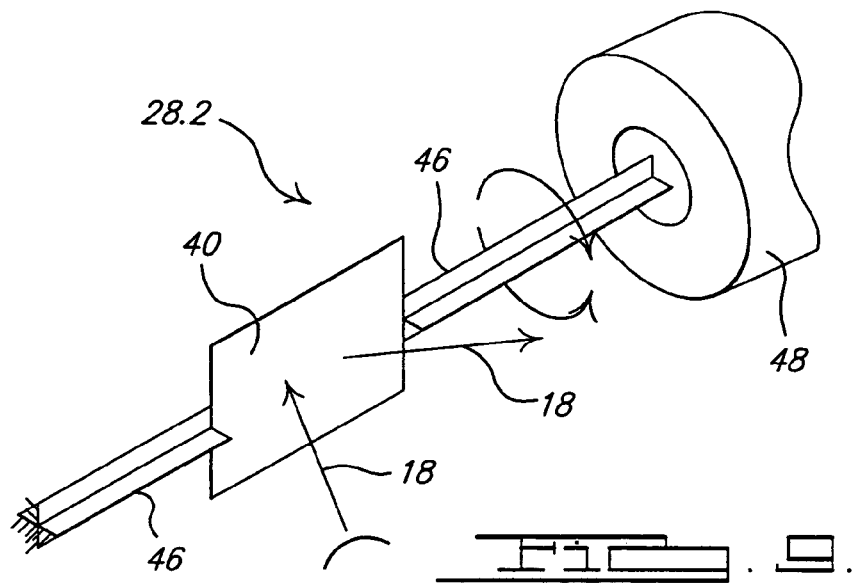
FIG. 9 illustrates an oscillating mirror for scanning a light curtain.

Referring to FIG. 9, in another embodiment of a light source positioner 28.2, the light curtain 18 can be scanned by reflection from a mirror 40 supported by torsion shafts 46 (at least one) that are oscillatorily rotated by a driver 48, for example a galvanometer or other electromagnetic device, or an electrostatic device. The torsion shaft 46/mirror 40 assembly, also known as a flex pivot device, is driven at resonance by the driver 48, causing the mirror to oscillate through an angle of rotation, e.g. a fixed angle of rotation for a particular drive signal to the driver 48. An associated sensing circuit provides a measure of when then the mirror 40 is positioned at a particular limit of oscillation, using either a signal of the driver 48 or a signal from a separate sensor. The position of the mirror 40 between its oscillatory limits can then be inferred with respect to time from the a priori kinematics of the associated motion. Flex pivot devices beneficially have relatively high reliability and an associated relatively long lifespan and mean time between failures (MTBF).

Other embodiments of the light source positioner 28 may be used. For example, the light curtain 18 may be scanned using holographic, electro-optic, or liquid crystal based systems. As another example, U.S. Pat. No. 6,598,139, incorporated herein by reference, illustrates another embodiment of a potential light source positioner 28.

A relatively high-speed, high-responsivity CMOS camera 32 continuously samples the region 20 of passenger-side of the vehicle 12, e.g. at a rate up to about 500 Hz. In one embodiment, the camera 32 is positioned along the centerline of the vehicle 12 several inches rearward of the intersection of headliner and windshield, which location is beneficial for the for following reasons: 1) it provides an optimal view of the vehicle's passenger compartment; 2) it ensures that the camera 32 will not be illuminated with direct sunlight, which can otherwise cause blooming of the sensor; and 3) it helps ensure that the field of view (FOV) of the camera 32 will not be occluded by a sun visor. The camera 32 is positioned to view the light stripes 22 projected by the light curtain 18, and is displaced relative to the light source 26 by a fixed offset distance, e.g. aft (in the Y direction) of the light source 26, e.g. by a distance sufficient to provide for determining the location of points within the light stripes 22 with sufficient accuracy. For example, both the light source 26 and the camera 32 might be mounted in the headliner of the vehicle 12 along the centerline thereof, e.g. in an overhead console.

Figure 10A:
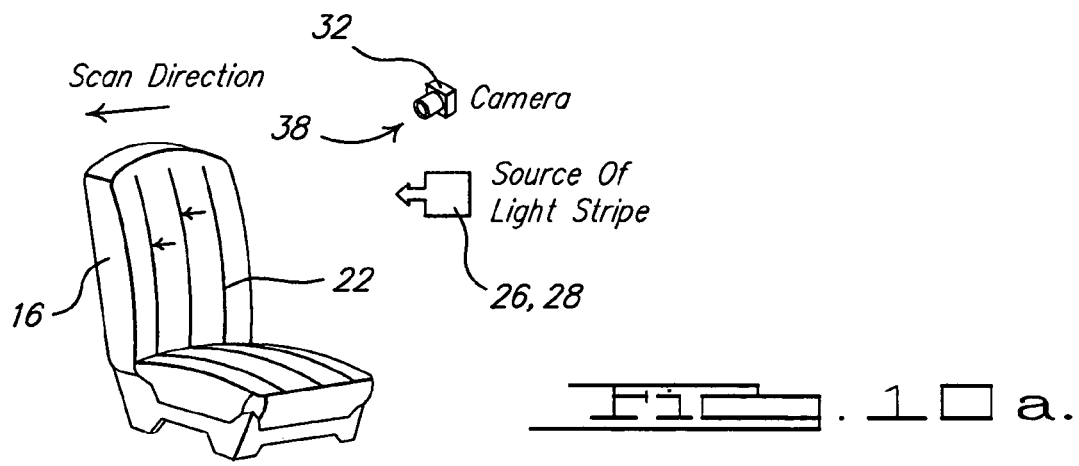
FIG. 10a illustrates an operation of the occupant detection system with an elevationally oriented light curtain that is scanned azimuthally.
Figure 10B:
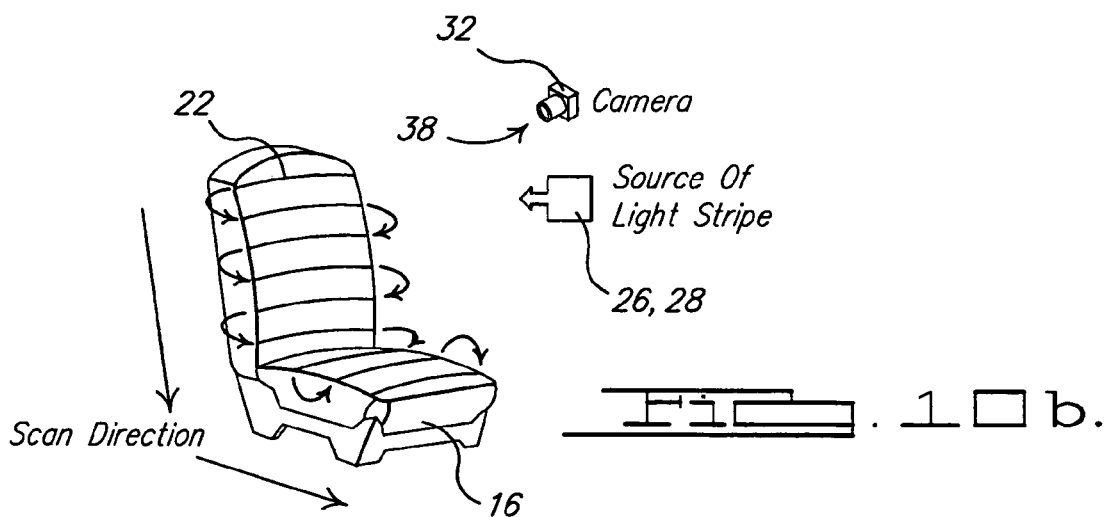
FIG. 10b illustrates an operation of the occupant detection system with an azimuthally oriented light curtain that is scanned elevationally.

The light curtain 18 is projected onto, and scanned across, the region 20 of the occupant compartment of the vehicle 12 so as to form a plurality of light stripes 22 on the surface of an occupant 14 or object on the seat 16. Alternatively, the light curtain 18 may be continuously activated and the camera 32, or a shutter operatively coupled thereto, may be intermittently activated so as to generate an associated plurality of light stripe 22 images. The light stripes 22 comprises a relatively thick beam of light that is projected by the light curtain 18, and the thickness is sufficiently great so that the intensity of the beam of light is eye-safe, even though there is a sufficient amount of light flux $\phi$ in the beam of light so as to be detectable—after subsequent image preprocessing—under direct sunlight conditions that would otherwise appear to obscure the light stripes 22. The image of the scanned light stripes 22 is analyzed to obtain sufficient information about the surface profile of an occupant 14 or object on the seat 16 in order to extract associated depth information relative to the surface of the seat 16, so as to provide for rendering the surface of the occupant 14 or object and to provide for constructing a model of the displacement thereof relative to the surface of the seat 16. The light source 26 that generates the light curtain 18 is offset from the camera 32 so that the depth information can be obtained from the resulting image of the associated light stripes 22. Referring to FIG. 10a, in one embodiment, the light curtain 18 is oriented to project substantially elevational light stripes 22, and is then scanned azimuthally. Referring to FIG. 10b, in another embodiment, the light curtain 18 is oriented to project substantially azimuthal light stripes 22, and is then scanned elevationally. In yet another embodiment, the light stripes 22 could be oriented obliquely, and scanned in a direction having an orthogonal component to the surface of the associated light curtain 18.

The particular offset between the light source 26 and the camera 32 is affected by a number of considerations, for example, accuracy, field of view, and packaging. For example, it is possible to select the offset between the light source 26 and the camera 32 so as to minimize the affect of angular and offset misalignments on the calculation of position for a particular point within a particular light stripe 22. Selecting the point with the largest position error (within the avoidance zone) as the "optimization" point may result in large increases in error at other points that would otherwise satisfy a particular accuracy criteria, e.g. ±12.5 millimeters. Furthermore, the selection of a particular offset distance can be affected by other criteria, e.g. production costs, ease of installation, size, etc. For example, mounting both the camera 32 and the light source 26 on a single, relatively small structure improves packaging within the vehicle 12, reduces associated cost, and provides for better control of associated translational and rotational-misalignments, relative to a system for which the camera 32 and light source 26 are housed in separate structures. Furthermore, for a light source 26 aligned to provide for a substantially vertical light curtain 18—i.e. in a plane parallel to one axis, e.g. the Z-axis—the associated position computations of the occupant detection system 10 are substantially independent of the camera 32/light source 26 offsets along the other two axes, thereby substantially eliminating two error sources, which helps to reduce associated production costs. Analysis of the error sources and their affect on the accuracy of the three-dimensional position calculations has shown that in a system with a 4 inch offset between camera 32 and light source 26 in a particular vehicle, the associated calculated position error will be within ±12.5 millimeters if the associated offset distance is within ±1.25 millimeters, and the associated angular rotation of the camera 32 relative to the light source 26 is within ±0.06 degrees.

While being scanned, the light curtain 18 is strobed under control of the processor 30 at successive intervals, in synchronization with the image acquisition start and stop times of the camera 32, so as to provide for acquiring a discrete set of images by the processor 30, wherein each image of the set corresponds to a different scan position of the light curtain 18, and a corresponding different position of the associated projected light stripe 22. For each image collected with the light curtain 18 on ("ON Image"), a second image is also collected with the light curtain 18 off ("OFF Image"). The resulting two images are then differenced, and the difference thereof is used to recover the light stripe 22 in the presence of direct sunlight, as described more fully hereinbelow. Alternatively, instead of capturing an OFF Image corresponding to each ON Image, a single OFF Image could be captured, e.g. for each set of scans, and used as a common background reference to be subtracted from each ON image.

Referring to FIG. 11, in accordance with one embodiment of an occupant detection process 500, in step (502), the seating location, e.g. in the passenger compartment, is characterized so as to provide a model of the seating surfaces of the seat 16, for later use in modeling and classifying occupants or objects on the seat. Then, in accordance with a scanning and imaging process 600, in step (600), the light curtain 18 is scanned and a set of images of the resulting light stripes 22 are acquired. Then, in step (506), the seat position is determined, for example, by either measuring the seat track location and seat back angle directly, or by processing portions of the images from the scanning and imaging process 600 of step (600). Then, in step (1600), after all of the light stripe images are acquired over a complete scan of the light curtain 18, the data from the resulting images is modeled and then classified so as to determine whether or not an occupant 14 is seated on the seat 16, and if so, the type, size and position of the occupant 14. Then, in step (510), the safety restraint system 36 (e.g. air bag inflator 36.1) is controlled responsive to this classification information. The occupant detection process 500 then repeats with step (600). Each of the aforementioned steps of the occupant detection process 500 is described more fully hereinbelow.

Referring to FIG. 12, the scanning and imaging process 600 commences with step (602), wherein the scan position of the light curtain 18 is initialized, e.g. by the light source positioner 28. For example, with a motor-driven light source positioner 28.1, the scanning and imaging process 600 would commence when the mirror 40 is at a position corresponding to the beginning of the scan. Then, in step (604), the light curtain 18 is switched OFF, and in step (604), the camera 32 acquires an OFF Image of the background. Then, as described more fully hereinbelow, in step (608), the exposure time of the camera is adjusted so as to avoid saturation from ambient light (e.g. sunlight) while also providing sufficient dynamic range to acquire useful images of the light stripes 22. Then, in step (610), the light curtain 18 is turned ON, and in step (612), the camera 32 acquires an ON Image, which includes the light stripe 22 resulting from the projection of the light curtain 18 on the seat 16 and occupant 14 or object located thereon. In step (614), the camera exposure is checked, and a corresponding flag is set to later adjust the exposure if necessary, as described more fully hereinbelow.

Referring to FIG. 13, from the perspective of the camera 32, a light curtain 18 intersecting an occupant 14 causes a portion of the resulting light stripe 22 to be laterally displaced responsive to the three-dimensional profile of the occupant 14. Accordingly, this lateral displacement of the light within each light stripe 22 corresponds to a shape profile of the object illuminated thereby, which in combination with that of the other light stripes 22 during a scan, provides for determining a measure of the overall size and volume of an occupant 14 or object occupying the seat 16.

In step (616), the useful information of the light stripe 22 is separated from the associated background clutter using a subtractive imaging process, wherein the OFF Image is subtracted from the ON Image, pixel by pixel, so as to create a difference image. The signal level—e.g. as represented by an 8-bit value—in the difference image will be close to zero everywhere except at the locations of the light stripe 22. For embodiments wherein the energy of the light stripe 22 is distributed by spreading the thickness of the light curtain 18 so as to provide for eye safety, the signal level of the light stripe 22 in the image is relatively low. In step (618), this signal is then amplified by binning the pixels in the difference image, as described more fully hereinbelow. The binning process comprises a spatial integration of the signal in the difference image. In step (620), the binned image is then binarized with a thresholding algorithm, which, for example, sets the associated pixels to an ON value if the pixel value is greater than or equal to a threshold, and to an OFF value if the pixel value if less then the threshold. FIG. 14 illustrates an example of a binarized image 50 resulting from the application of the above-described imaging processes to the difference image associated with the image illustrated in FIG. 13.

In step (622), the accuracy of the shape profile associated with the light stripe 22 is improved by thinning the binary object into an object of single-pixel-width using a skeletonization process. For example, FIG. 15 illustrates a skeletonized image 52 resulting from the skeletonization of the image illustrated in FIG. 14. The skeletonization process, also known as a thinning process, provides a bi-level image comprising a set of lines that represent the shape of the object, wherein the associated skeletal pixels can be considered to be the medial axis of the object. For example, a skeletonization or thinning process is described in the html document ccc.hw.ac.uk/hipr/html/thin which is available on the Internet (preceded by www).

Features of the occupant 14 or object on the seat 16 can occlude the light curtain 18 resulting in gaps 54 in the image of the resulting light stripe 22. In step (624), these gaps 54 are filed by an interpolation process by which a gap 54 between segments 56 of the light stripe 22 is filled by a cubic spline interpolation therebetween. The resulting binary interpolated image 58 is a representation of the object's shape, i.e. profile, at a particular scan location of the light stripe 22. For example, FIG. 16 illustrates an interpolated image 58 resulting from the interpolation of the image illustrated in FIG. 15. In step (626), the interpolated image 58—is stored in memory 34.

Figure 17:
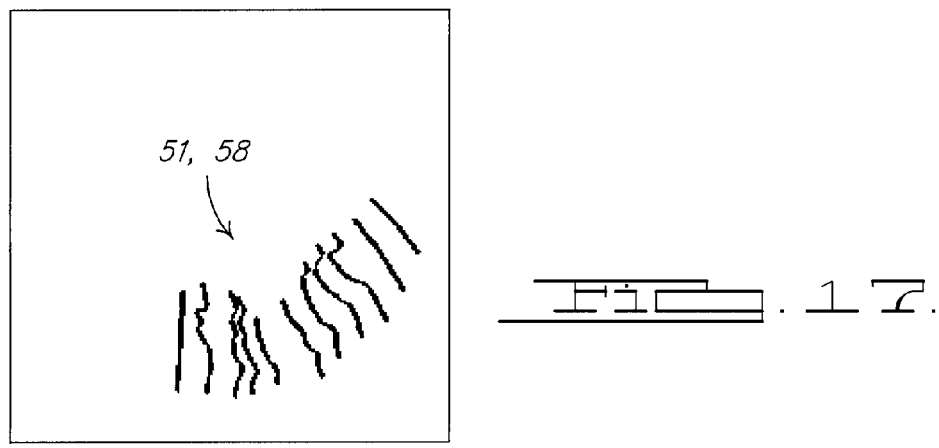
FIG. 17 illustrates a composite of a plurality of processed light stripes resulting from a complete scan of the light curtain and associated image processing.

In step (628), if the scan of the light curtain is not complete, then, in step (630), the position of the light curtain 18 is incremented (e.g. by waiting for the motor 42 to reach the next rotation angle of the mirror 40), and the above-described process repeats with step (604). The above-described processes are repeated for each of the scan locations of the light curtain 18. After all of the scan locations have been imaged, then in step (632) from step (628), the scanning and imaging process 600 is completed, thereby returning to the occupant detection process 500, having stored in memory 34 a composite set of interpolated images 58 of the light stripes 22 for each of the scan locations. For example, FIG. 17 illustrates a composite of the interpolated images 58 of for all of the light stripes 22 generated during a complete scan of the light curtain 18 by the light source positioner 28, revealing the associated underlying three-dimensional shape profile of the occupant 14 on the seat 16.

The above-described scanning and imaging process 600 inherently performs the operations of segmentation (signal isolation) and signal amplification during each processing cycle. Segmentation is the isolation and identification of objects of interest (the region of the light stripe 22) while de-emphasizing background objects (objects outside the window and fixed regions belonging to the vehicle's interior). Signal amplification is necessary in the recovery of relatively low illumination levels in the presence of high ambient sunlight levels. It should be understood that the above-described scanning and imaging process 600 can be modified within the scope of the instant invention. For example, the exposure control step (608) could be performed once per set of scans or at less frequent intervals, for example, responsive to an ambient light sensor. Furthermore, steps (612), (628) and (630) could be clustered so as to provide for acquiring and storing all of the ON Images prior to the image processing of steps (616) through (626) so that the processing of the scanned images is performed once per set of scans.

Figure 19:
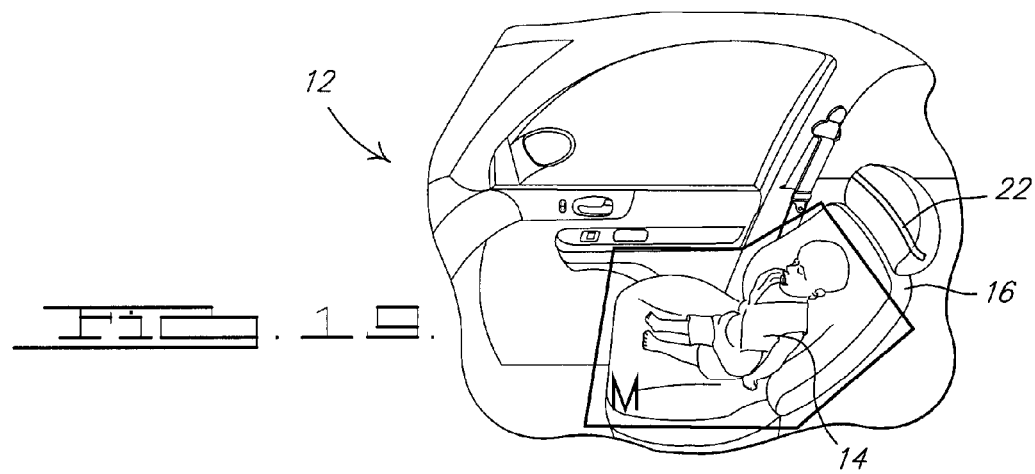
FIG. 19 illustrates an example of mask region used in calculations for automatic exposure control of a camera by the image preprocessing process.
Figure 18:
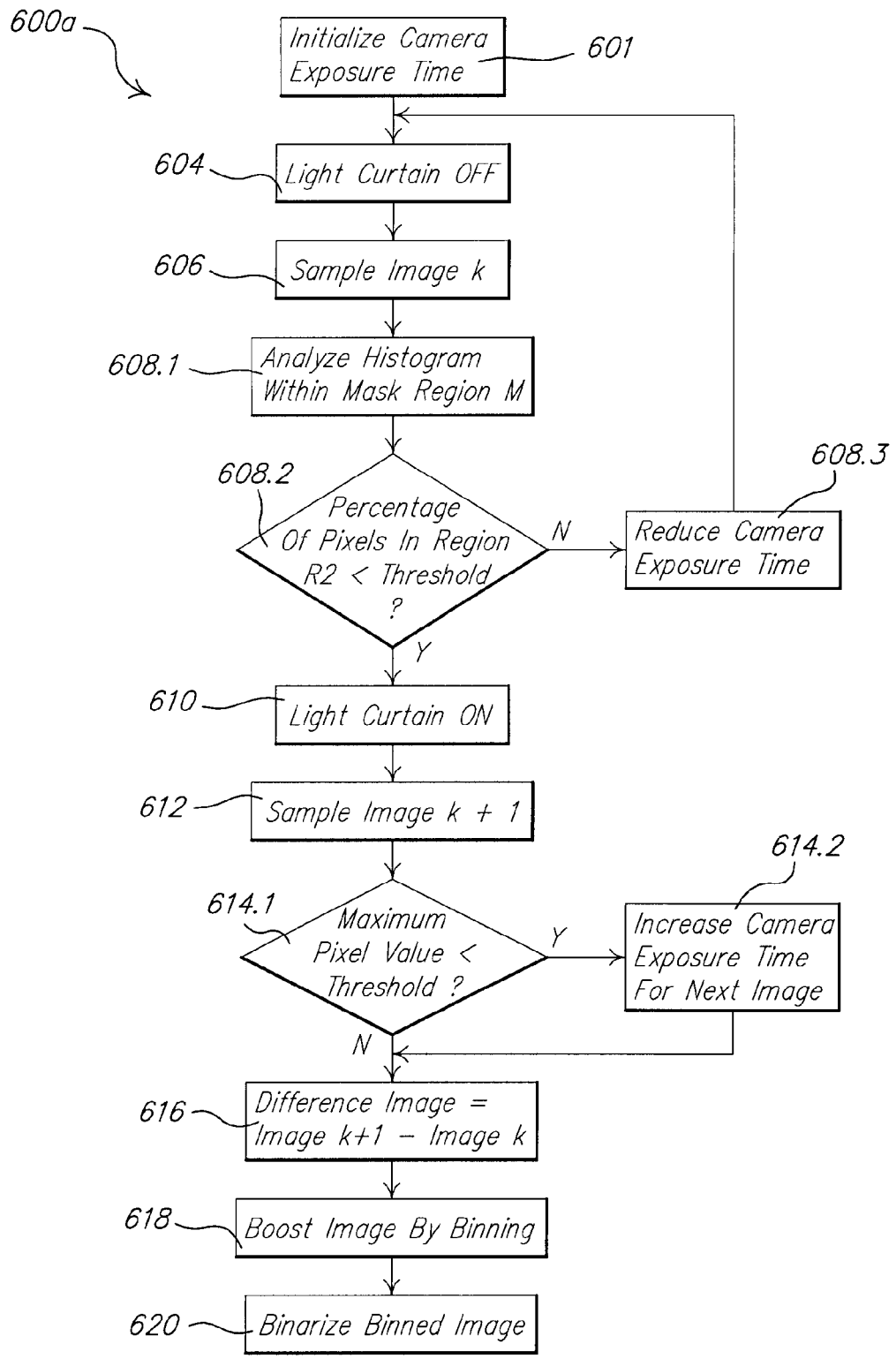
FIG. 18 illustrates a flow chart of an image preprocessing process.

Referring to FIG. 18, an image preprocessing process 600a of the scanning and imaging process 600 begins with step (601) by initializing the exposure time of the camera 32. The exposure time is initially adapted so that the image pixels corresponding to a light stripe 22 will have a value that is substantially greater than the noise threshold of the camera 32. In steps (604), and (606), a $k^{th}$ image of the background is sampled by the camera 32 with the light curtain 18 OFF. In step (608.1), the $k^{th}$ image of the background is analyzed within a mask region M, e.g. as illustrated in FIG. 19, to determine the percentage of points within a mask region M having corresponding pixel values that are greater than a threshold value, for purposes of determining whether the exposure time of the camera 32 needs to be reduced so as to prevent the camera 32 from being saturated by ambient light, e.g. sunlight. So long as a given set of pixels across the light stripe 22 is not saturated by a sufficient margin, with the light curtain OFF, then the hereinbelow described binning technique will be able to recover the light stripe 22 in the preprocessed image, so that the light stripe 22 can be used for purposes of occupant detection.

Figure 20:
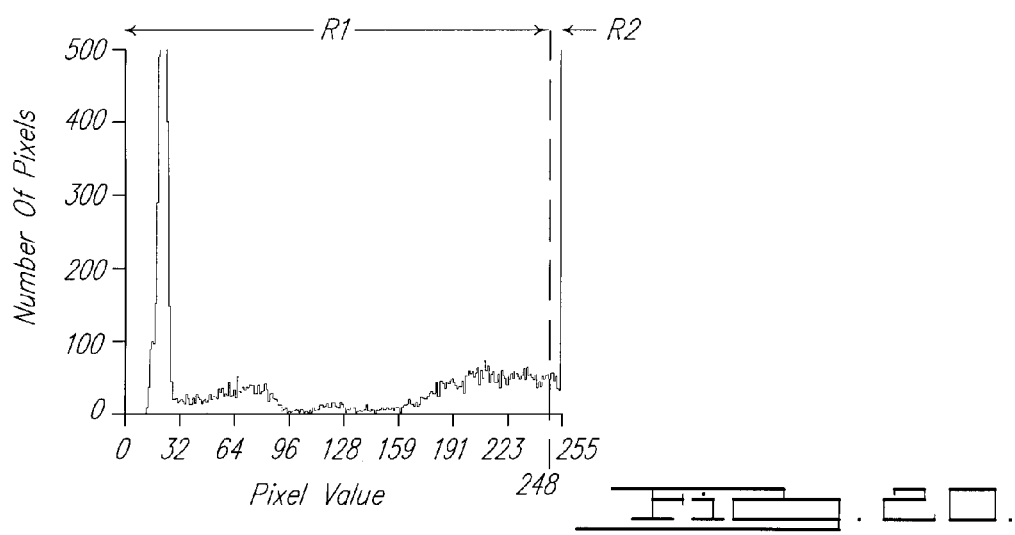
FIG. 20 illustrates an example of a histogram of the mask region used for automatic exposure control of the camera.

The mask region M is adapted to surround the region in the image wherein at least a portion of the image of the light stripe 22 would be expected to be located. The value of each pixel in the image from the camera 32 is represented, for example, by an 8-bit number that ranges from 0 to 255. FIG. 20 illustrates an example of a histogram of the pixel values for pixels within the mask region M for an image with the light curtain 18 OFF, wherein for each of the 256 different possible pixel values, the number of pixels of that value within the mask region M of is plotted as a function of pixel value in an associated histogram. In step (608.2), if a threshold percentage—e.g. 2%—of pixels—having a value greater than a threshold pixel value—e.g. 248, defining region R2 in FIG. 20,—indicating a relatively high level of ambient lighting, e.g. from sunlight as illustrated in FIG. 19, then in step (608.3) the exposure time of the camera 32 is reduced—e.g. by a factor,—and the process repeats with step (604). For example, the threshold pixel value is adapted to be lower than the maximum pixel value by an amount equal to at least the noise threshold of the camera 32, e.g. 6-8 pixels. Notwithstanding that FIG. 19 illustrates an image from the camera 32 with the light curtain 18 ON for purposes of illustrating the placement of the mask region M, the determination in step (608.2) is made with the light curtain 18 OFF. Furthermore, notwithstanding that step (608.1) and FIG. 20 illustrate the use of a histogram, it should be understood that the determination in steps (608.1) and (608.2) of whether or not to reduce the camera exposure time is equivalent to the determination of whether or not the total number of pixels having pixel values exceeding the threshold pixel value, exceeds a threshold number of pixels corresponding to the threshold percentage, because the total number of pixels in mask region M is fixed.

Following step (608.2) if the exposure time is correct, in steps (610) and (612), a $(k+1)^{th}$ image is sampled by the camera 32 with the light curtain 18 ON, wherein k and k+1 respectively identify two consecutive images. In step (614.1), if the maximum pixel value in the difference image is less than a threshold value, then in step (614.2), a flag is set that will cause the exposure time of the camera 32 to be increased in step (601) when the next image is sampled. Accordingly, whereas step (608.3) provides for reducing the exposure time responsive to high ambient lighting, e.g. from sunlight, step (614.2) provides for subsequently increasing the exposure time responsive to a subsequent decrease in ambient lighting, e.g. when driving on a sunny day from an open road into a tunnel. The maximum pixel value in step (614.1) would typically correspond to a pixel within the light stripe 22.

The imaging system acts to detect the reflected or scattered ligth from the light stripe 22. The process of detecting the reflected or scattered light, or distinguishing this light from the associated ambient lighting, can be difficult under conditions of high ambient lighting, for example, because of ambient sunlight conditions. The signal of the reflected or scattered light from the light curtain 18 may be distinguished from the noise of the associated ambient lighting by subtracting an image with the light curtain 18 OFF (i.e. a background image), from an image with the light curtain 18 ON, so as to substantially cancel the image components that are common to both images, i.e. image components that are relatively static with respect to the camera 32 or light curtain 18 for consecutive images. The differencing operation substantially eliminates portions of the signal that are common to the ON and OFF images, including the common-mode signal of relatively high brightness that would result from illumination by direct sunlight. The signal in the difference image is substantially close to zero everywhere except the region on which the beam is projected. In an exemplary system, images of 2 milliseconds duration are successively captured, alternately with the light source 26 ON and the light source 26 OFF. Successive images are subtracted from one another to form an associated difference image, which is then used to detect those pixels corresponding to the image of the light curtain 18 upon—and therefor intersecting with—either the interior of the vehicle, an occupant 14 or object, or a portion thereof.

Accordingly, following either steps (614.1) or (614.2), in step (616), a difference image is formed by subtracting the $k^{th}$ image from the $(k+1)^{th}$ image so as to cancel the background signal common to both images, leaving an image of the light from the light stripe 22 of the light curtain 18 that is reflected or scattered by surfaces that intersect therewith. The subtractive imaging process cancels the common mode signal, so that the signal-to-noise ratio of the difference image is higher than that of the image with the light curtain 18 ON.

It should be understood that steps (610) through (614.2) could be performed before steps (604) through (608.3), although the previously-described order provides for reduced latency because the information about the occupant 14 or object on the seat 16 is in the image with the light curtain 18 ON, which is acquired last, i.e. most recent. Generally, the difference image is formed by subtracting the image with the light curtain 18 OFF from the image with the light curtain 18 ON.

In accordance with one technique of subtractive image processing, a difference image is formed after each new set of consecutive images are captured, so that difference images are formed at half the rate at which images are acquired by the camera 32, as follows, wherein ON indicates an image signal with the light curtain 18 ON, and OFF indicates an image signal with the light curtain 18 OFF:

Difference Image 1=Image 1: light curtain ON−Image 2: light curtain OFF

Difference Image 2=Image 3: light curtain ON−Image 4: light curtain OFF

Difference Image 3=Image 5: light curtain ON−Image 6: light curtain OFF

In the above process there is an inherent latency of one sampling period before the difference image is affected by information from the image with the light curtain 18 ON. This latency may be eliminated by updating the difference image after the image with the light curtain 18 ON is captured,—rather than after the image with the light curtain 18 OFF is captured—as follows:

Difference Image 1=Image 2: light curtain ON−Image 1: light curtain OFF

Difference Image 2=Image 4: light curtain ON−Image 3: light curtain OFF

Difference Image 3=Image 6: light curtain ON−Image 5: light curtain OFF

The process of detecting an occupant 14 penetrating the light curtain 18 may be improved under dynamic conditions by forming a new difference image after each new image acquired rather than after a pair of consecutive images are acquired—the number of difference images formed being one less than the total number of images acquired—as follows:

Difference Image 1=Image 1: light curtain ON−Image 2: light curtain OFF

Difference Image 2=Image 3: light curtain ON−Image 2: light curtain OFF

Difference Image 3=Image 3: light curtain ON−Image 4: light curtain OFF

Referring to FIG. 21, the subtractive imaging process is illustrated for a relatively high level of ambient lighting. In a 4×4 array of 16 pixels in a region of the image that includes the light stripe 22, in a first image 21a with the light curtain 18 OFF, the pixel values in the array 21b range from 208 to 228 units; and in a second image 21c with the light curtain 18 ON, the pixel values in the array 21d range from 214 to 233 units. The corresponding array 21e of pixels in the difference image has pixel values ranging from 5 to 7 units. Accordingly, in the region where the light curtain 18 is projected, the count level for an 8-bit difference signal can be relatively small. A cross-section 21f in the difference image through the light stripe 22 of the light curtain 18 illustrates a pulse-shaped feature 21g corresponding to the light stripe 22, having a peak of about 8 units.

Referring again to FIG. 18, in step (618), the signal in the difference image is boosted by a binning process, wherein the values of all pixels within a given array are summed to produce a single value representative of that array, the size of which is referred to as a binning factor. The binning operation spatially integrates and compresses the signal of the difference image. For example, binning factors of 2×2, 4×4 and 8×8 regions have been used. Furthermore, the binning factor may be adaptively controlled responsive to the characteristics of either the difference image or the resulting binned image, for example, so that the range of values in the binned image span a threshold value. Generally, in the binning process, regions of size n×n are identified in the difference image and then summed together to form a much smaller image. The resulting binned image may then expanded to its original size, or the subsequent processing may be adapted to the binned space, which is compressed relative to the difference image space. Although the binning operation reduces image resolution, it is very effective in recovering relatively low illumination levels in the presence of high ambient sunlight levels. For example, using 8×8 binning, the light stripe 22 can be recovered even when its irradiance is as low as 3% of the background sunlight level within the wavelength band of interest. For example, a 1.5 count average difference between pixels of the image of the light stripe 22 for ON and OFF images can produce a corresponding 8×8 binned pixel having a pixel value of 96 counts (out of 255). For purposes of illustration, in order to achieve the same signal levels in a system without binning, the light curtain 18 would need to have substantially more irradiance—which could affect eye safety—and/or the exposure time of the camera 32 would need to be increased—which could cause saturation of the camera 32 under conditions of high ambient lighting.

Referring to again to FIG. 21, a binning process using a 4×4 binning factor is illustrated, wherein the 4×4 array 21e in the difference image is summed to produce a corresponding bin value 21h of 96. The bin values are then stretched over the original image space so as to form a binned image 21i. A cross-section 21j in the binned image 21i through the light stripe 22 of the light curtain 18 illustrates a pulse-shaped feature 21k corresponding to the light stripe 22, having a peak of about 100 units, which is over 8 times greater than the corresponding peak in the difference image. For a difference image with pixel values that are as low as 6 counts on average, a 4×4 binning provides a summed signal of 96 counts on average. The binning process is adapted to operate on non-overlapping arrays of pixels. A convolution process—wherein the difference image is convolved with a unity amplitude rectangular pulse function—would provide for a similar amplification of the difference signal, but would be slower.

Referring again to FIG. 18, the binned image is then binarized in step (620) at an appropriate threshold within the dynamic range of the camera 32, whereby pixels having a brightness value less than a threshold are set to a value of zero, and pixels having a brightness value greater than the threshold are set to a value of unity, so as to generate an associated binary binned image signal 51.

A Field Programmable Gate Array (FPGA) may be adapted to perform the hereinabove described differencing (616), binning (618), and binarization (620) operations so as to reduce the computational load on the microprocessor of the processor 30, the processing time, the electronic package size, the associated power consumption, and the per unit cost. Processing time can be reduced in comparison with a software implementation on a microprocessor, because parallel arithmetic operations tailored to the image differencing and binning process can be realized in hardware using the FPGA. The FPGA is custom designed and sized for the process, providing for reducing size, power consumption and per unit cost, precluding the need for superfluous circuitry that would otherwise be needed to support general purpose signal processing. Using FPGA gates for temporary image data storage instead of a separate RAM integrated circuit further reduces part count. The FPGA can also be used to control a CMOS camera 32 without an external memory chip or support circuitry. Furthermore, the FPGA may be implemented in an Application Specific Integrated Circuit (ASIC) when the production volume justifies the non-recoverable engineering (NRE) cost associated with an ASIC.

Referring to FIG. 22, there is illustrated an exemplary processing algorithm that can be used to implement the differencing and binning processes in a FPGA using a substantially minimum number of gates therein, wherein the binning process is illustrated with a 4×4 binning factor. The image signal from the image sensor 152 of the camera 32 is stored in an image buffer 154 through a first FIFO (first in-first out) buffer 156. At the beginning of any given imaging cycle, e.g. either steps (606) or (612) of FIG. 18, the image buffer 154 will contain a complete image from the previous cycle. For example, at the beginning of step (606), the image buffer 54 will contain an image with the light curtain 18 ON, and at the beginning of step (612), the image buffer 54 will contain a corresponding image with the light curtain 18 OFF. Accordingly, commencing with step (612) of the imaging process, the image buffer 54 will have stored therein an image with the light curtain 18 OFF, the image data from the image sensor 152 will be of a scene with the light curtain 18 ON, and the image sensor 152 will be providing—pixel by pixel—an image with the light curtain 18 ON. For a given pixel location, an old pixel value 158 is loaded into a second FIFO buffer 160 from the image buffer 54, and the corresponding new pixel value 162 is then loaded from the image sensor 152 through the first FIFO buffer 156 into the corresponding location of the image buffer 54. The old pixel value 158 is subtracted from the new pixel value 162 at a summing junction 164 so as to form a difference pixel value 166, and a successive number—e.g. four—of difference pixel values 166 are added together in an accumulator 168, wherein the successive number that are added is given by the binning factor. The value of the accumulator 168 is reset to zero after each group of difference pixel values 166 is accumulated. The accumulator 168 outputs a column-binned value 170 for each set of difference pixel values 166 from a particular row of the difference image. A first row of column-binned values 170.1, corresponding to the first row of the difference image, is stored in a first row buffer 172.1. After the first row of the image is processed, a second row of column-binned values 170.2, corresponding to the second row of the difference image, is stored in a second row buffer 172.2. This process continues in succession until the 4$^{th}$ row of column-binned values 170.4 for a 4×4 binning factor (or generally, the K$^{th}$ row for a K×K binning factor), whereupon corresponding column-binned values 170.1, 170.2, 170.3 and 170.4 are added together by an adder 174, so as to calculate the corresponding binned values 176 for the first four rows of the image. After the first four (or generally K) rows are processed, the above described process continues with the next four (or generally K) rows, and so on, until all of the rows in the image are binned. Alternatively, a single row buffer 172 could be used instead of separate row buffers 172.1, 172.2, etc., wherein the first row of column-binned values 170.1 are first stored in the row buffer 172, and subsequent column-binned values 170.2, 170.3 and 170.4 are added thereto, thereby producing the final binned values 176 after the final column-binned values 170.4 are processed.

Figure 23:
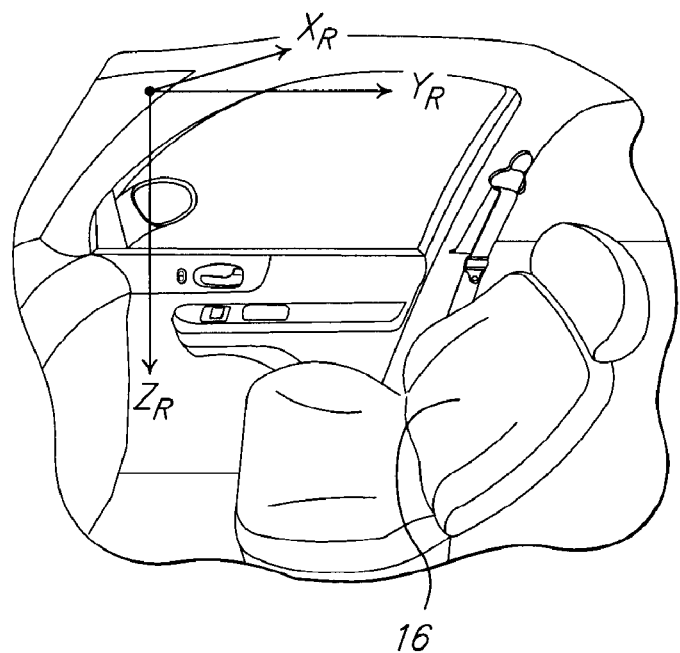
FIG. 23 illustrates an image of the passenger compartment of a vehicle and an associated reference coordinate system of the occupant detection system.

The three dimensional profile of an object intersecting the light stripe 22 can be calculated using the known position and angular rotations of both the camera 32 and the light source 26 with respect to the reference coordinate system $(X_R, Y_R, Z_R)$, the origin of which is assumed to be coincident with the center of the camera lens 38. One example of a reference coordinate system in a passenger compartment of a vehicle 12 is illustrated in FIG. 23. An example of a methodology of these calculations is given as follows:

In the three-dimensional reference coordinate system, for a planar light curtain 18, the equation of the plane containing the light curtain 18 is:

for an elevation primary system (i.e. substantially elevational light stripe 22):

$$(x-a)\cdot\cos(\beta)+(y-b)\cdot\cos(\alpha)\cdot\sin(\beta)+(z-c)\cdot\sin(\alpha)\cdot\cos(\beta) = 0; \text{ and} \quad (1a)$$

for an azimuth primary system (i.e. substantially azimuthal light stripe 22):

$$(x-a)\cdot\sin(\beta)\cdot\sin(\alpha)-(y-b)\cdot\cos(\beta)\cdot\sin(\alpha)+(z-c)\cdot\cos(\alpha) = 0 \quad (1b)$$

wherein a, b and c are the translational offsets of the light source 26 with respect to the origin of the reference coordinate system along the X, Y and Z axes respectively. The elevation and azimuth angles of rotation of the light curtain 18 relative to the reference coordinate system $(X_R, Y_R, Z_R)$ are $\alpha$ and $\beta$ respectively. If $\alpha$ and $\beta$ are both zero, the light curtain 18 lies in the plane defined by:

$$x=a \text{ for an elevation primary system, and} \quad (2a)$$

$$z=c \text{ for an azimuth primary system} \quad (2b)$$

Figure 24:
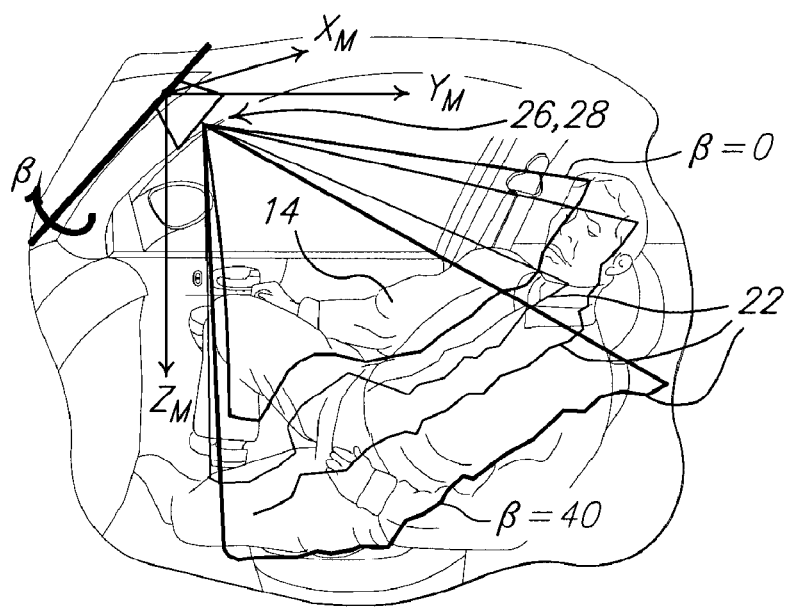
FIG. 24 illustrates the operation of an embodiment of the occupant detection system using a substantially elevationally oriented light curtain.

Referring to FIG. 24, if an elevationally oriented light curtain 18 is rotated by an angle $\beta$ about an axis parallel to $Z_R$, the equation defining the plane that contains the light curtain 18 reduces to:

$$(x-a)\cdot\cos(\beta)+(y-b)\cdot\sin(\beta)=0; \text{ as } \alpha=0 \quad (3)$$

FIG. 24 illustrates a light source coordinate system $(X_M, Y_M, Z_M)$, the origin of which is assumed to be coincident with the center of the light curtain 18 along the rotational axis of the light source positioner 28, wherein the light source coordinate system $(X_M, Y_M, Z_M)$ is translated with respect to the reference coordinate system $(X_R, Y_R, Z_R)$.

If the azimuth primary system is rotated by an angle $\alpha$ about an axis parallel to $X_R$, the equation defining the plane that contains the light beam stripe reduces to:

$$-(y-b)\cdot\sin(\alpha)+(z-c)\cdot\cos(\alpha)=0; \text{ as } \beta=0 \quad (4)$$

Energy from a light stripe 22 reflected from an object intersecting the light curtain 18 is received by the camera 32 and focused on associated pixel(s) of an associated focal plane array (FPA), which provides a pixelated image—in a corresponding two-dimensional pixel space having associated camera coordinates—of an object as seen by the camera 32. Energy reflected from an object penetrating the light curtain 18 is imaged by the camera lens 38 and illuminates corresponding pixels of the FPA. The direction cosines $i_c$, $j_c$ and $k_c$, expressed in camera coordinates, for each illuminated pixel are given by the following equations:

$$i_c = \cos(\delta)\cdot h \quad (5.1)$$

$$j_c = [i_c^2 + k_c^2]^{1/2} \quad (5.2)$$

$$k_c = \sin(\delta)\cdot h \quad (5.3)$$

wherein $i_c$, $j_c$ and $k_c$ are the direction cosines, and h and $\delta$ are given as follows:

$$h = [\sin^2\{(m^2+n^2)^{1/2}\cdot\psi/(2\cdot m_{max})\}]^{1/2} \quad (6)$$

$$\delta = \tan^{-1}(n/m) \quad (7)$$

wherein $\psi$=camera field of view (FOV), and m and n are the azimuthal and elevational positions of the illuminated pixel The direction cosines $i_c$, $j_c$ and $k_c$ constitute components of an associated direction cosine vector, which can be transformed from the camera coordinate system to the coordinates of the reference coordinate system by a rotational transformation by a camera rotational angles matrix as follows:

$$\begin{bmatrix} i_r \\ j_r \\ k_r \end{bmatrix} = \begin{bmatrix} \cos(\theta) & -\sin(\theta)\cdot\cos(\phi) & \sin(\theta)\cdot\sin(\phi) \\ \sin(\theta) & \cos(\theta)\cdot\cos(\theta) & -\cos(\theta)\cdot\sin(\phi) \\ 0 & \sin(\phi) & \cos(\phi) \end{bmatrix} \cdot \begin{bmatrix} i_c \\ j_c \\ k_c \end{bmatrix} \quad (8)$$

wherein θ and φ are the azimuth and elevation angles of the camera 32, respectively.

The components of a vector [$x_p$, $y_p$, $z_p$], of length l, from the origin of the reference coordinate system to the point ($x_p$, $y_p$, $z_p$) in object space on the light curtain 18 corresponding to the illuminated pixel, and representing the direction in which the illuminated pixel is staring, is given by:

$$x_p = \lambda \cdot i_r \quad (9.1)$$

$$y_p = \lambda \cdot j_r \quad (9.2)$$

$$z_p = \lambda \cdot k_r \quad (9.3)$$

wherein l is the length of the vector from the reference point origin to the pierce point in the light curtain 18 plane ($x_p$, $y_p$, $z_p$).

The three-dimensional coordinates of the surface of the object illuminated by the light stripes 22 can then be obtained by 1) substituting equations (9.1-9.3) for $x_p$, $y_p$ and $z_p$ into equation (1a or 1b); 2) solving for λ; and 3) substituting the value of λ in equations (9.1-9.3), for each one or more associated points of the object that are illuminated by—and which therefore penetrate—the light curtain 18.

Referring again to FIG. 11, in step (502), in accordance with a first embodiment of a process for determining seat position, the above scanning, processing, and coordinate transformation processes are applied to the empty passenger seat in order to create a three-dimensional representation of the seating surface. This process is repeated for all possible combinations of seat track position and seat back tilt angles. The resulting (x, y, z) coordinates of all of the resulting images of the corresponding light stripe 22 are indexed according to seat track and seat back tilt angle and stored in memory 34 in a look-up table. The position of the passenger seat is determined using a seat track sensor and seat back angle sensor. The process of step (502) is a system calibration step that would typically be performed once for a particular vehicle 12/seat 16 configuration. Then, in step (506), measurements of seat track position and seat back angle can be used to determine the associated calibrated three-dimensional representations of the associated seating surfaces.

Figure 25A:
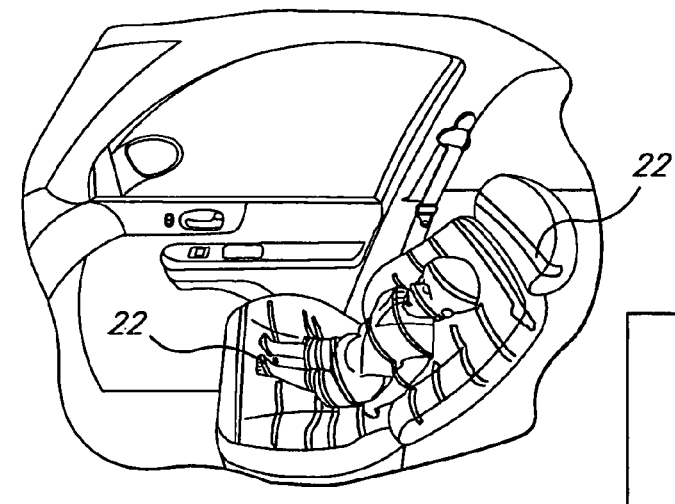
FIG. 25a illustrates an occupant on a seat illuminated by a composite of a plurality light stripes resulting from an elevationally scanned substantially azimuthal light curtain.
Figure 25B:
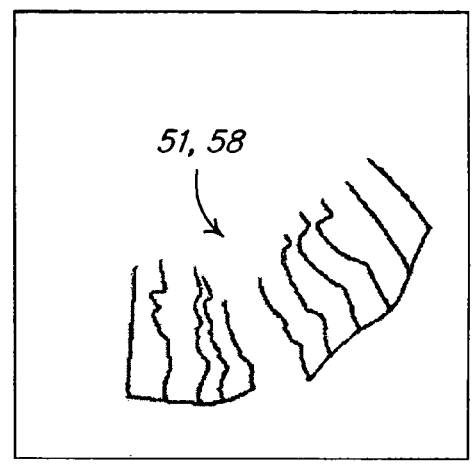
Figure 26A:
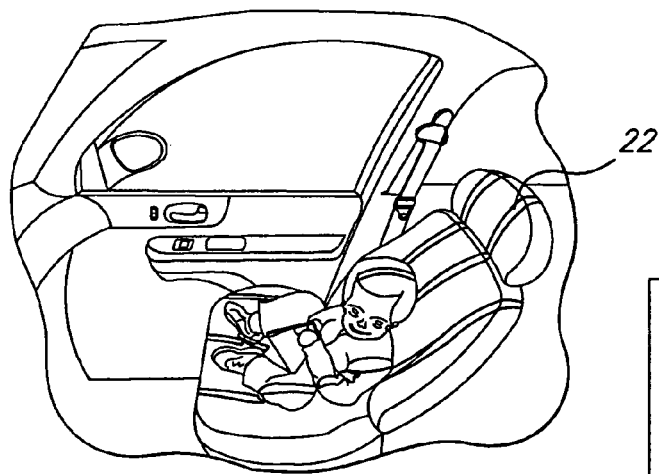
FIG. 26a illustrates an occupant on a seat illuminated by a composite of a plurality light stripes resulting from an azimuthally scanned substantially elevational light curtain.
Figure 26B:
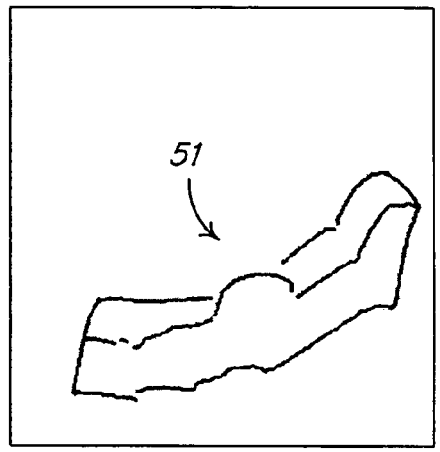

In accordance with a second embodiment of a process for determining seat position, in step (506), the position of the seat 16 can be derived solely from images acquired by the camera 32 of at least a portion of the seat 16, thereby precluding the need for the calibration step (502) of the first embodiment. Referring to FIGS. 25*a* and 25*b*, if the light curtain 18 is substantially azimuthal and scanned elevationally, some portion of either the left or right edge of both the seat bottom and seat back is visible from the perspective of the camera 32. The left or right edge points of the seat's two-dimensional shape profile are connected and used to calculate the seat back angle and location, along the y-axis, of the seat bottom. Referring to FIGS. 26*a* and 26*b*, if the light curtain 18 is substantially elevational and scanned azimuthally, some portion of the top and bottom edge of the seat 16 is visible from then perspective of the camera 32. The top and bottom edge points of the two-dimensional shape profile of the seat 16 are used to calculate the seat back angle and seat bottom location. For those instances in which the left and right seat edges are momentarily blocked because the occupant is in an unusual position, the previous known seat position information can be used.

In accordance with a third embodiment of a process for determining seat position, the calibration step (502) is performed in accordance with the first embodiment, and in step (506), the seat position is determined in accordance the second embodiment in combination with the added constraint that the resulting seat position conforms to one of the predetermined seat positions used in the calibration step (502).

Figure 27:
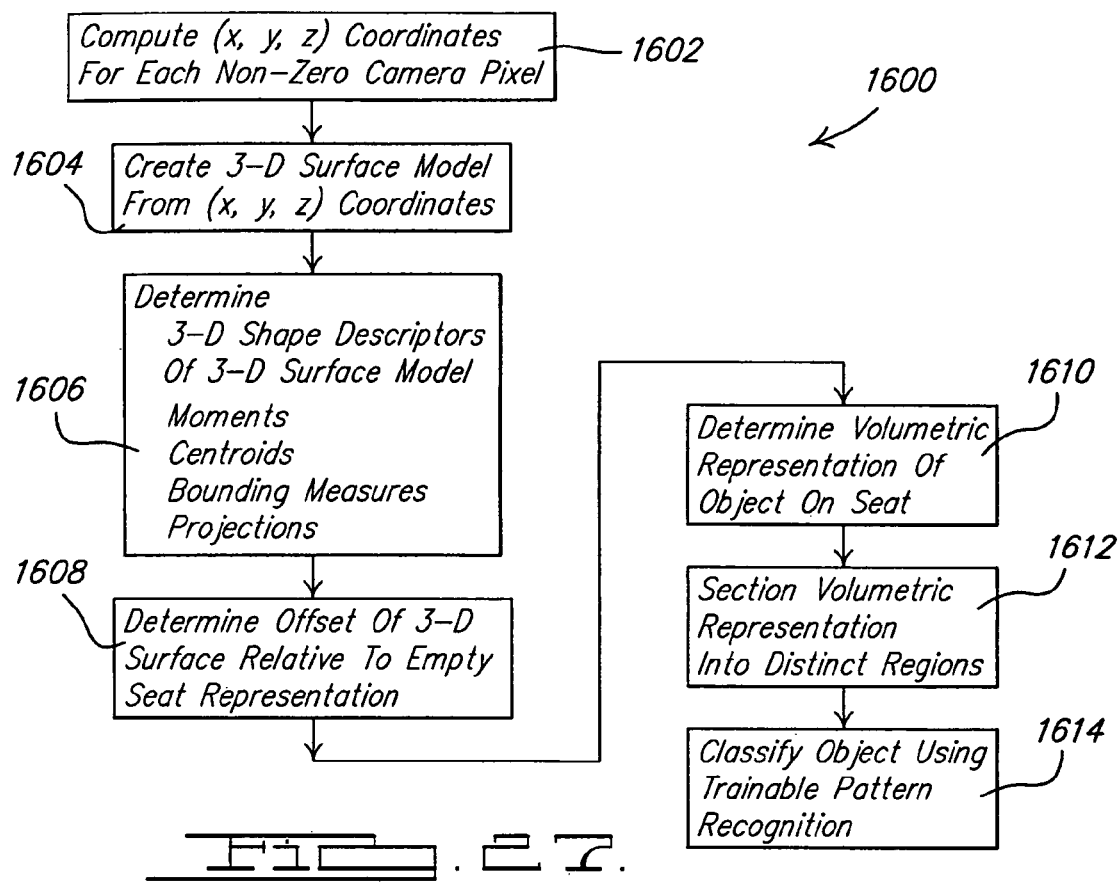
FIG. 27 illustrates a flow chart of a modeling and classification process.
Figure 28:
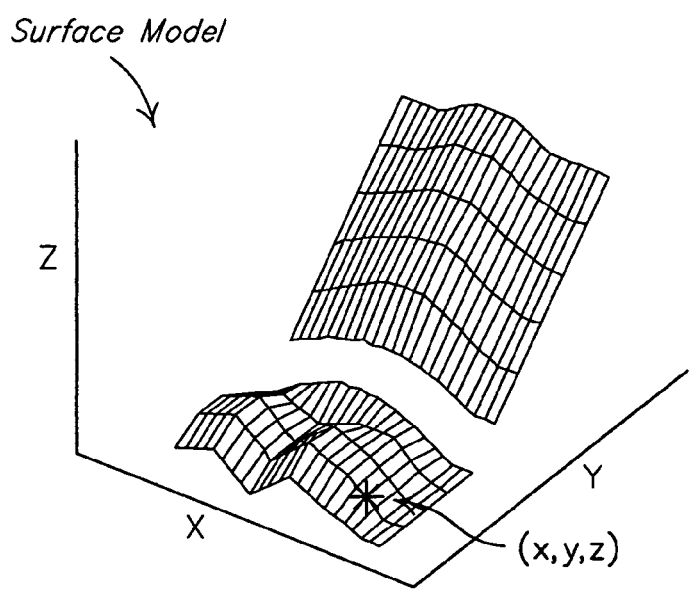
FIG. 28 illustrates a three-dimensional surface model of an occupant on a seat.

Referring to FIGS. 11 and 27, a modeling and classification process 1600 generates a model of the surface corresponding to the composite image of the light stripes 22 resulting from a complete scan of the light curtain in accordance with the above-described scanning and imaging process 600. Beginning with step (1602), using the coordinate transformations defined above, a (x, y, z)-coordinate is computed for each nonzero pixel of the interpolated images 58 from scanning and imaging process 600. Each scan line has a fixed number of points determined by the resolution and field-of-view of the camera 32. In step (1604), the (x, y, z)-coordinates of the separate scan lines are combined to create a three-dimensional surface model, e.g. as illustrated in FIG. 28.

In step (1606), a set of three-dimensional mathematical shape descriptors, including: moments, centroids, bounding measures, and projections are used to compactly represent the surface model. The individual three-dimensional shape descriptors are selected such that, for a representative set of training data, their magnitudes are similar for objects of the same class and noticeably different for objects of all other classes. Stated in another way, the classes are selected and populated so that there is tight intra-class clustering and large inter-class separation. U.S. Pat. No. 6,961,443, which is incorporate herein by reference, describes various descriptors and metrics, and associated techniques that can be used in accordance with the instant invention.

In step (1608), the three-dimensional deviation or offset of the scanned object relative to the empty seat representation (e.g. from steps (502) and (506)), is determined for the current position of the seat 16, the latter of which is determined in accordance with one of the several embodiments described hereinabove for the process of step (506). For example, the (x, y, z)-coordinates of all scan lines for the empty seat representation are obtained from a stored look-up table, and the three-dimensional offset of the scanned object is computed as the Euclidean distance between an (x, y, z)-coordinate of the object's scan data and the corresponding (x, y, z)-coordinate of the empty seat's scan data.

Figure 29:
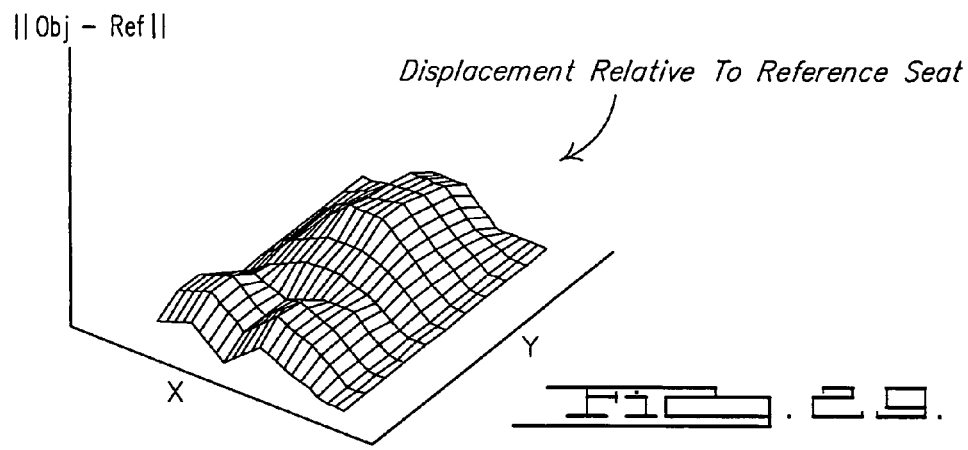
FIG. 29 illustrates a volumetric representation of the occupant on the seat, corresponding to FIG. 28.
Figure 30:
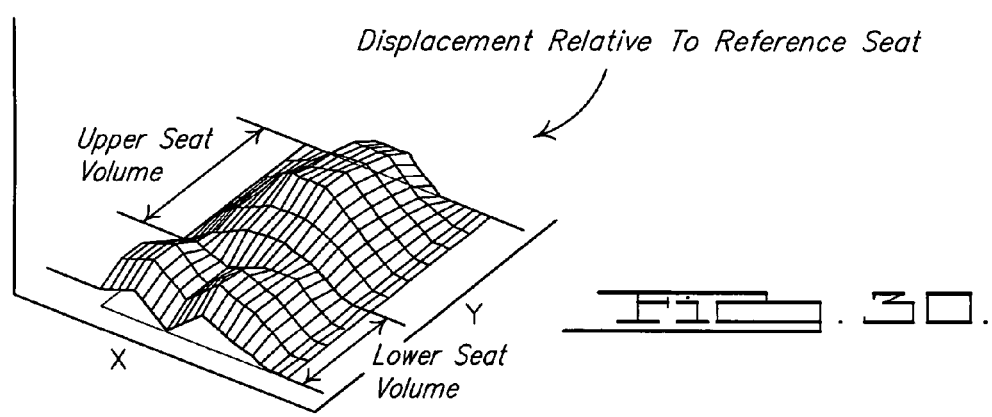
FIG. 30 illustrates a sectioning of the volumetric representation of FIG. 29 into regions corresponding to the upper and lower seat, respectively.

In step (1610), a volumetric representation of the object is then obtained from the combination of all three-dimensional deviations for each such pair of (x, y, z)-coordinates from step (1608). For example, FIG. 29 illustrates a volumetric representation of the object corresponding to FIG. 28, wherein the volumetric representation is graphically displayed by connecting neighboring pairs of (x, y, z)-coordinates. In step (1612), the volumetric representation from step (1610) is sectioned into two distinct regions respectively corresponding to the upper seat and the lower seat, for example, as illustrated in FIG. 30. The volumetric representation—as a whole, and by section—can be used as a measure of overall object size and to determine if the seat is empty, occupied, or partially occupied.

Figure 31:
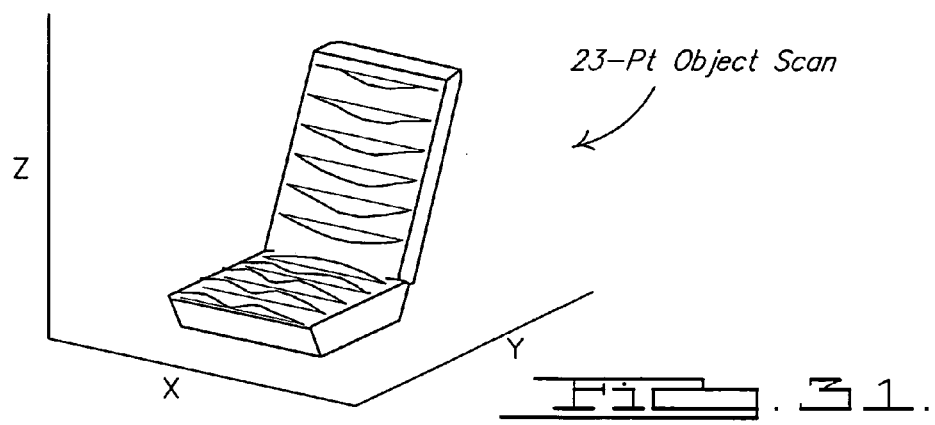
FIG. 31 illustrates a superposition of scan lines from an object with scan lines corresponding to an empty seat representation.

Referring to FIG. 31, operation of the occupant detection system 10 is illustrated for a system with eleven scan positions of the light curtain 18. For each scan position, there is illustrated a substantially straight line corresponding to the associated empty seat representation, and another line corresponding to the associated light stripe 22 resulting from the intersection of the light curtain 18 with the occupant 14 or object, each line comprising 23 associated (x, y, z)-coordinates. The corresponding volumetric representation illustrated in FIG. 29 is represented by a surface model comprising a grid of 23-by-11 points.

In step (1614), the occupant 14 or object is classified with a trainable pattern recognition system using the volumetric representation(s) from steps (1610) and (1612), and the shape descriptors from step (1606). This trainable pattern recognition system is taught to discriminate between the possible classes using a knowledge base acquired by experience from numerous examples. The seat position, seat back angle, upper seat volume, lower seat volume, and three-dimensional shape descriptors associated with each object scan compactly represent the characteristics of that object. For example, the training set may contain several thousand object scans for each of the five primary classes and six subclasses in order to accurately account for variations in sizes, shapes, and positional variations of occupants and baby seats. With an accurate pattern match, the characteristics of an untrained object scan closely match the characteristics of a trained object scan. In practice, a series of separate back-propagated artificial neural networks have proven to be highly successful in the recognition of all distinct occupant scenarios, wherein each neural network is trained exclusively to recognize one particular class of information.

A rule-based system may be added to complement the decision of the pattern recognition system, wherein the rules are designed to apply, without exception, to every possible variation within a class. The rules may be developed in such a way as to include or exclude specific classes. For example, if the upper seat volume and lower seat volume are both zero, the classification of the object scan must be an empty seat. Or, for example, if the upper seat volume is zero, the classification cannot possibly be normally-seat adult occupant, FFIS or small child.

In accordance with one embodiment, an occupant 14 located in the front passenger-side quadrant of the vehicle 12 is classified into one of the following five distinct classes: (1) rear facing infant seat (RFIS), (2) forward facing infant seat (FFIS) or small child, (3) normally seated adult occupant, (4) empty seat or (5) out-of-position occupant (OOP). The normally seated occupant class is further classified into one of the following three distinct sub-classes: (a) small child, (b) fifth percentile female, and (c) 95 percentile male. The OOP class is further classified into one of the following three distinct classes depending upon which body part enters a predetermined avoidance zone proximate to the air bag inflator 36.1: (a) "hands-in-danger", (b) "head-in-danger", and (c) "feet-in-danger". The above classification provides for adapting the deployment of the air bag deployment decision and/or deployment force to maximize safety and minimize risk of injury.

The classification by the occupant detection system 10 provides for inhibiting the safety restraint system 36/air bag inflator 36.1 for certain classes of occupants and seat occupancy scenarios, e.g. RFIS, FFIS, small child, OOP, or empty seat; or for adapting the associated inflation characteristic of the air bag inflator 36.1 responsive to the size of the object, alone or in combination with a measure of crash severity from a crash sensor 60. In one embodiment, the occupant detection system 10 is adapted to be sufficiently fast to detect—just prior to a prospective deployment of the air bag inflator 36.1—a penetration of the avoidance zone by the occupant 14 so as to provide for what is known as dynamic suppression of the deployment of the air bag inflator 36.1 when the occupant 14 sufficiently penetrates the avoidance zone. Accordingly, in this embodiment, the occupant detection system 10 is adapted to be responsive to the motion of the occupant 14, e.g. as a result of pre-crash braking or crash-induced motion that may occur early in the crash event. For example, referring to FIG. 1, if the air bag inflator 36.1 is enabled by the occupant detection system 10 via the AND gate 62, then the air bag inflator 36.1 is actuated responsive to a crash detected by a crash sensor 60.

The occupant detection system 10, using structured lighting as described hereinabove, beneficially provides shape information for each of the classes; avoids misclassification that might otherwise result from gray-scale variation, e.g. as caused by sunlight, shadow, or materials; and recovers the intended target without the otherwise complexity and expense of separate segmentation. In one embodiment, the occupant detection system 10 also uses a LED based illumination technique that overcomes the regulatory and safety problems inherent with using laser-based illumination. The occupant detection system 10 provides for sensing three-dimensional position using only a single camera 32, which is beneficial in reducing hardware costs and algorithm complexity in comparison with a stereo vision system.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

What is claimed is:

1. A method of detecting an object, comprising:
   a. setting an exposure time for a process of generating an image signal;
   b. generating an image signal representative of a first image of the object, wherein said image signal is generated by a camera at a first location, and said image signal is generated responsive to said exposure time;
   c. projecting from a second location at least one beam of light across at least a portion of the object so as to provide for generating at least one image of at least one light stripe of a plurality of light stripes across said object, wherein said second location is displaced from said first location, an intensity of each light stripe of said plurality of light stripes is less than a first threshold, and said first threshold corresponds to an intensity level that is safe for direct viewing by a human eye;
   d. generating at least one image signal representative of at least one second image from said camera, wherein said at least one second image is responsive to said at least one beam of light projected on said object;
   e. subtracting said first image from said at least one second image so as to form at least one difference image signal of at least one difference image;
   f. processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image, wherein the operation of processing said at least one difference image so as to generate said corresponding at least one fourth image comprises:

i. forming a binned image value of a binned image by accumulating a plurality of pixel values within a region of said at least one difference image; and
  ii. repeating the operation of forming said binned image value for a plurality of adjacent regions of said at least one diffference image; and
  g. determining at least one profile of said object responsive to said at least one fourth image.

2. A method of detecting an object, comprising:
  a. setting an exposure time for a process of generating an image signal;
  b. generating an image signal representative of a first image of the object, wherein said image signal is generated by a camera at a first location, said first location is proximate to a headliner of a vehicle, and said image signal is generated responsive to said exposure time;
  c. projecting from a second location at least one beam of light across at least a portion of the object so as to provide for generating a least one image of least one light stripe of a plurality of light stripes across said object, wherein said second location is displaced from said first location, an intensity of each light stripe of said plurality of light stripes is less than a first threshold, and said first threshold corresponds to an intensity level that is safe for direct viewing by human eye;
  d. generating at least one image signal representative of at least one second image from said camera, wherein sad at least one second image is responsive to said at least one beam of light projected on said object;
  e. subtracting said first image from said at least one second image so as to form at least one difference image signal of at least one difference image;
  f. processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image; and
  g. determining at least one profile of said object responsive to said at least one fourth image.

3. A method of detecting an object, comprising:
  a. setting an exposure time for a process of generating an image signal;
  b. generating an image signal representative of a first image of the object, wherein said image signal is generated by a camera at a first location, said first location is proximate to a centerline of said vehicle, and said image signal is generated responsive to said exposure time;
  c. protecting from a second location at least one beam of light across at least a portion of the object so as to provide for generating at least one image of at least one light stripe of a plurality of light stripes across said object, wherein said second location is displaced from said first location, an intensity of each light stripe of said plurality of light stripes is less than a first threshold, and said first threshold corresponds to an intensity level that is safe for direct viewing by a human eye;
  d. generating at least one image signal representative of at least one second image from said camera, wherein said at least one second image is responsive to said at least one beam of light projected on said object;
  e. subtracting said first image from said at least one second image so as to form at least one difference image signal of at least one difference image;
  f. processing said at least one difference image so as generate a corresponding at least one fourth image, wherein a signal level of at least a portion of said at least one fourth image associated with said at least one light strip in said at least one fourth image is boosted relative to a corresponding signal level in said at least one second image; and
  g. determining at least one profile of said object responsive to said at least one fourth image.

4. A method of detecting an object as recited in claim 1, wherein said first image is generated absent said at least one beam of light projected on said object.

5. A method of detecting an object, comprising:
  a. setting an exposure time for a process of generating an image signal;
  b. generating an image signal representative of a first image of the object, wherein said image signal is generated by a camera at a first location, and said image signal is generated responsive to said exposure time;
  c. adjusting said exposure time responsive to at least a portion of said first image so as to either reduce saturation or increase dynamic range of at least a portion of said first image;
  d. projecting from a second location at least one beam of light across at least a portion of the object so as to provide for generating at least one image of at least one light stripe of a plurality of light stripes across said object, wherein said second location is displaced from said first location, an intensity of each light stripe of said plurality of light stripes is less than a first threshold, and said first threshold corresponds to an intensity level that is safe for direct viewing by a human eye;
  e. generating at least one image signal representative of at least one second image from said camera, wherein said at least one second image is responsive to said at least one beam of light projected on said object;
  f. subtracting said first image from said at least one second image so as to form at least one difference image signal of at least one difference image;
  g. processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image; and
  h. determining at least one profile of said object responsive to said at least one fourth image.

6. A method of detecting an object as recited in claim 1, comprising:
  a. setting an exposure time for a process of generating an image signal;
  b. generating an image signal representative of a first image of the object, wherein said image signal is generated by a camera at a first location, and said image signal is generated responsive to said exposure time;
  c. projecting from a second location at least one beam of light across at least a potion of the object so as to provide for generating at least one image of at least one light stripe of a plurality of light stripes across said object, wherein said second location is displaced from said first location, said second location is proximate to a headliner of a vehicle, an intensity of each light stripe of said plurality of light stripes is less than a first threshold, and said first threshold corresponds to an intensity level that is safe for direct viewing by a human eye;
  d. generating at least one image signal representative of at least one second image from said camera, wherein said at least one second image is responsive to said at least one beam of light projected on sad object;

e. subtracting said first image from said at least one second image so as to form at least one difference image signal of at least one difference image;

f. processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image; and g. determining at least one profile of said object responsive to said at least one fourth image.

7. A method of detecting an object as recited in claim 1, wherein at least one of said plurality of light stripes is generated by scanning said at least one beam of light.

8. A method of detecting an object as recited in claim 7, wherein said at least one beam of light comprises a spot of light that is scanned in a plurality of directions.

9. A method of detecting an object as recited in claim 7, wherein said at least one beam of light comprises a light curtain.

10. A method of detecting an object as recited in claim 9, wherein said light curtain is substantially planar, and said light curtain is scanned in a direction that is substantially transverse to said light curtain.

11. A method of detecting an object as recited in claim 10, wherein said light curtain is substantially elevationally oriented and is scanned in a substantially azimuthal direction.

12. A method of detecting an object as recited in claim 10, wherein said light curtain is substantially azimuthally oriented and is scanned in a substantially elevational direction.

13. A method of detecting an object as recited in claim 1, wherein said plurality of light stripes are generated responsive to an intermittent activation of a light source.

14. A method of detecting an object as recited in claim 1, wherein said plurality of light stripes are generated responsive to an intermittent activation of said camera or a shutter associated with said camera.

15. A method of detecting an object as recited in claim 1, wherein said at least one beam of light comprises near-infrared light, and the operations of generating said image signal representative of said first image and generating said at least one image signal representative of said at least one second image comprise capturing light that is within a frequency range that includes at least one frequency of said near-infrared light.

16. A method of detecting an object as recited in claim 1, further comprising binarizing said at least one fourth image prior to the operation of determining said at least one profile of said object, wherein the operation of binarizing is responsive to a threshold.

17. A method of detecting an object as recited in claim 1, further comprising skeletonizing said at least one fourth image prior to the operation of determining said at least one profile of said object.

18. A method of detecting an object as recited in claim 1, further comprising interpolating said at least one fourth image prior to the operation of determining said at least one profile of said object, wherein the operation of interpolating said at least one fourth image provides for filling gaps that may exist in said at least one light stripe within said at least one fourth image.

19. A method of detecting an object as recited in claim 1, wherein a plurality of said at least one fourth images corresponding to a plurality of said light stripes are stored as a composite fourth image, and the operation of determining said at least one profile of said object is responsive to said composite fourth image.

20. A method of detecting an object as recited in claim 1, wherein the operation of determining said at least one profile comprises determining object space coordinates of at least one non-zero pixel of said at least one fourth image.

21. A method of detecting an object, comprising:

a. setting an exposure time for a process of generating an image signal;

b. generating an image signal representative of a first image of the object, wherein said image signal is generated by a camera at a first location, and said image signal is generated responsive to said exposure time;

c. projecting from a second location at least one beam of light across at least a portion of the object so as to provide for generating at least one image of at least one light strite of a plurality of light stripes across said object, wherein said second location is displaced from said first location, an intensity of each light stripe of said plurality of light stripes is less than a first threshold, said first threshold corresponds to an intensity level that is safe for direct viewing by a human eye;

d. generating at least one image signal representative of at least one second image from said camera, wherein said at least one second image is responsive to said at least one beam of light projected on said object;

e. subtracting said first image from said at least one second image so as to form at least one difference image signal of at least one difference image;

f. processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image; and g. determining at least one profile of said object responsive to said at least one fourth image; and h. generating a characterization of at least one proximate surface proximate to which the object is located.

22. A method of detecting an object as recited in claim 21, wherein said object is located on a seat of a vehicle, and the operation of generating a characterization of said at least one proximate surface proximate to which said object is located comprises retrieving at least one representation of said at least one proximate surface responsive to at least one signal representative of a position of said seat.

23. A method of detecting an object as recited in claim 21, wherein the operation of generating a characterization of said at least one proximate surface proximate to which said object is located is responsive to a profile determined from a portion of said at least one fourth image, wherein said portion of said at least one fourth image is representative of at least a portion of said at least one proximate surface proximate to which said object is located.

24. A method of detecting an object, comprising:

a. setting an exposure time for a process of generating an image signal;

b. generating an image signal representative of a first image of the object, wherein said image signal is generate by a camera at a first location, and said image signal is generated responsive to said exposure time;

c. projeting from a second location at least one beam of light across at least a portion of the object so as to provide for generating at least one image of at least one light stripe of a plurality of light stripes across said object, wherein said second location is displace from said first location, an intensity of each light stripe of said plurality of light strives is less than a first threshold, and said first threshold corresponds to an intensty level that is safe for direct viewing by a human eye;

d. generating at least one image signal representative of at least one second image from said camera, wherein said at least one second image is responsive to said at least one beam of light projected on said object;

e. subtracting said first image from said at least one second image so as to form at least one difference image signal of at least one difference image;

f. processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image;

g. determining at least one profile of said object responsive to said at least one fourth image;

h. determining at least one feature of said object responsive to said at least one profile, and i. classifying said object responsive to said at least one feature.

25. A method of detecting an object as recited in claim 24, further comprising:

a. generating a representation of a surface of said object illuminated by said at least one beam of light, wherein said representation of said surface is relative to said at least one proximate surface, and b. generating a volumetric representation of said object responsive to said representation of said surface of said object, wherein the operation of classifying said object is further responsive to said volumetric representation of said object.

26. A method of detecting an object as recited in claim 25, wherein said volumetric representation is sectioned into first and second volumetric representations corresponding to first and second portions of said object, and the operation of classifying said object is further responsive to said first and second volumetric representations of said object.

27. A method of detecting an object as recited in claim 26, wherein said object is positioned proximate to a seat of a vehicle, said first volumetric representation is responsive to a volume of said object proximate to an upper portion of said seat, and said second volumetric representation is responsive to a volume of said object proximate to a lower portion of said seat.

28. A method of detecting an object as recited in claim 24, wherein said at least one feature comprises a plurality of said features, and the operation of classifying said object is responsive to said plurality of said features.

29. A method of detecting an object as recited in claim 1, wherein the operation of classifying said object is performed at least in part by a trainable pattern recognition system.

30. A method of detecting an object as recited in claim 29, wherein said trainable pattern recognition system comprises a back-propagated neural network.

31. A method of detecting an object as recited in claim 29, wherein said trainable pattern recognition system is trained to distinguish between at least two classes selected from a rear facing infant seat, a forward facing infant seat, a small child, a normally seated occupant, an empty seat and an out-of-position occupant.

32. A method of detecting an object as recited in claim 29, wherein said trainable pattern recognition system is further trained to distinguish between at least two classes selected from a normally seated small child, a normally seated fifth percentile female, a normally seated fiftieth percentile male and a normally seated ninety-fifth percentile male.

33. A method of detecting an object as recited in claim 29, wherein said trainable pattern recognition system is further trained to distinguish between at least two classes selected from an out-of-position occupant with at least one hand in a predetermined avoidance zone, an out-of-position occupant whose head is in a predetermined avoidance zone, and an out-of-position occupant with at least one foot in a predetermined avoidance zone.

34. A method of detecting an object as recited in claim 24, further comprising controlling a safety restraint system of a vehicle responsive to the operation of classifying said object.

35. A method of providing for detecting an object, comprising:

a. providing for setting an exposure time for a process of generating an image signal;

b. providing for generating an image signal representative of a first image of the object, wherein said image signal is generated by a camera at a first location, and said image signal is generated responsive to said exposure time;

c. providing for projecting from a second location at least one beam of light across at least a portion of the object so as to provide for generating at least one image of at least one light stripe of a plurality of light stripes across said object, wherein said second location is displaced from said first location, an intensity of each light stripe of said plurality of light stripes is less than a first threshold, and said first threshold corresponds to an intensity level that is safe for direct viewing by a human eye;

d. providing for generating at least one image signal representative of at least one second image from said camera, wherein said at least one second image is responsive to said at least one beam of light projected on said object;

e. providing for subtracting said first image from said at least one second image so as to form at least one difference image signal of at least one difference image;

f. providing for processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image, wherein the operation of processing said at least one difference image so as to generate said corresponding at least one fourth image comprises:

i. forming a binned image value of binned image by accumulating a plurality of pixel values within a region of said at least one difference image; and ii. repeating the operation of forming said binned image value for a plurality of adjacent regions of said at least one difference image; and g. providing for determining at least one profile of said object responsive to said at least one fourth image.

36. A method of providing for detecting an, comprising:

a. providing for setting an exposure time for a process of generating an image signal;

b. providing for generating an image signal representative of a first image of the object, wherein said image signal is generated by a camera at a first location, and said image signal is generated responsive to said exposure time;

c. providing for adjusting said exposure time responsive to at least a portion of said first image so as to either reduce saturation or increase dynamic range of at least a portion of said first image;
d. providing for projecting from a second location at least one beam of light across at least a potion of the object so as to provide for generating at least one image of at least one light stripe of a plurality of light stripes across said object, wherein said second location is displaced from said first location, an intensity of each light stripe of said plurality of ligth stripes is less than a first threshold, and said first threshold corresponds to an intensity level that is safe for direct viewing by a human eye;
e. providing for generating at least one image signal representative of at least one second image from said camera, wherein said at least one second image is responsive to said at least one beam of light projected on said object;
f. providing for subtracting said first image from said at least one second image so as to form at least one difference image signal of at least one difference image;
g. providing for processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image; and
h. providing for determining at least one profile of said object responsive to said at least one fourth image.

37. A method of providing for detecting an object as recited in claim 35, further comprising providing for binarizing said at least one fourth image prior to the operation of determining said at least one profile of said object, wherein the operation of binarizing is responsive to a threshold.

38. A method of providing for detecting an object as recited in claim 35, further comprising providing for skeletonizing said at least one fourth image prior to the operation of determining said at least one profile of said object.

39. A method of providing for detecting an object as recited in claim 35, further comprising providing for interpolating said at least one fourth image prior to the operation of determining said at least one profile of said object, wherein the operation of interpolating said at least one fourth image provides for filling gaps that may exist in said at least one light stripe within said at least one fourth image.

40. A method of providing for detecting an object, comprising:
a. providing for setting an exposure time for a process of generating an image signal;
b. providing for generating an image signal representative of a first image of the object, wherein said image signal is generated by a camera at a first location, and said image signal is generated responsive to said exposure time;
c. providing for projecting from a second location at least one beam of light across at least a portion of the object so as to provide for generating at least one image of at least one light stripe of a plurality of light stripes across said object, wherein said second location is displaced from said first location, an intensity of each light stripe of said plurality of light stripes is less than a first threshold, and said first threshold corresponds to an intensity level that is safe for direct viewing by a human eye;
d. providing for generating at least one image signal representative of at least one second image from said camera, wherein said at least one second image is responsive to said at least one beam of light projected on said object;
e. providing for subtracting said first image from said at least one second image so as to form at least one difference image signal of at least one difference image;
f. providing for processing said at least one difference image so as generate a corresponding at least one fourth image, wherein a signal level of at least a portion of said at least one fourth image associated with said at least one light stripe in said at least one fourth image is boosted relative to a corresponding signal level in said at least one second image;
g. providing for determining at least one profile of said object responsive to said at least one fourth image; and
h. providing for generating a characterization of at least one proximate surface proximate to which the object is located.

41. A method of providing for detecting an object as recited in claim 35, further comprising:
a. providing for determining at least one feature of said object responsive to said at least one profile, and
b. providing for classifying said object responsive to said at least one feature.

42. A method of providing for detecting an object as recited in claim 41, further comprising:
a. providing for generating a characterization of at least one proximate surface proximate to which the object is located;
b. providing for generating a representation of a surface of said object illuminated by said at least one beam of light, wherein said representation of said surface is relative to said at least one proximate surface; and
c. providing for generating a volumetric representation of said object responsive to said representation of said surface of said object, wherein the operation of classifying said object is further responsive to said volumetric representation of said object.

43. A method of providing for detecting an object as recited in claim 35, further comprising providing for controlling a safety restraint system of a vehicle responsive to the operation of classifying said object.

44. A method of detecting an object as recited in claim 1, wherein said first location is proximate to a headliner of a vehicle.

45. A method of detecting an object as recited in claim 1, wherein said first location is proximate to a centerline of said vehicle.

46. A method of detecting an object as recited in claim 1, further comprising adjusting said exposure time responsive to at least a portion of said first image so as to either reduce saturation or increase dynamic range of at least a portion of said first image.

47. A method of detecting an object as recited in claim 1, wherein said second location is proximate to a headliner of a vehicle.

48. A method of detecting an object as recited in claim 1, further comprising generating a characterization of at least one proximate surface proximate to which the object is located.

49. A method of detecting an object as recited in claim 48, wherein said object is located on a seat of a vehicle, and the operation of generating a characterization of said at least one proximate surface proximate to which said object is located comprises retrieving at least one representation of said at least one proximate surface responsive to at least one signal representative of a position of said seat.

50. A method of detecting an object as recited in claim 48, wherein the operation of generating a characterization of said at least one proximate surface proximate to which said object is located is responsive to a profile determined from a portion of said at least one fourth image, wherein said portion of said at least one fourth image is representative of at least a portion of said at least one proximate surface proximate to which said object is located.

51. A method of detecting an object as recited in claim 1, further comprising:

a. determining at least one feature of said object responsive to said at least one profile, and b. classifying said object responsive to said at least one feature.

52. A method of detecting an object as recited in claim 51, further comprising:

a. generating a representation of a surface of said object illuminated by said at least one beam of light, wherein said representation of said surface is relative to said at least one proximate surface, and b. generating a volumetric representation of said object responsive to said representation of said surface of said object, wherein the operation of classifying said object is further responsive to said volumetric representation of said object.

53. A method of detecting an object as recited in claim 52, wherein said volumetric representation is sectioned into first and second volumetric representations corresponding to first and second portions of said object, and the operation of classifying said object is further responsive to said first and second volumetric representations of said object.

54. A method of detecting an object as recited in claim 53, wherein said object is positioned proximate to a seat of a vehicle, said first volumetric representation is responsive to a volume of said object proximate to an upper portion of said seat, and said second volumetric representation is responsive to a volume of said object proximate to a lower portion of said seat.

55. A method of detecting an object as recited in claim 51, wherein said at least one feature comprises a plurality of said features, and the operation of classifying said object is responsive to said plurality of said features.

* * * * *